(12) United States Patent
Maki

(10) Patent No.: US 10,850,603 B2
(45) Date of Patent: Dec. 1, 2020

(54) HYBRID DRIVELINE ASSEMBLY

(71) Applicant: TEAM Industries, Inc., Bagley, MN (US)

(72) Inventor: Gregory L. Maki, Solway, MN (US)

(73) Assignee: TEAM Industries, Inc., Bagley, MN (US)

( * ) Notice: Subject to any disclaimer, the term of this patent is extended or adjusted under 35 U.S.C. 154(b) by 713 days.

(21) Appl. No.: 15/634,512

(22) Filed: Jun. 27, 2017

(65) Prior Publication Data

US 2017/0368925 A1 Dec. 28, 2017

Related U.S. Application Data

(60) Provisional application No. 62/355,048, filed on Jun. 27, 2016.

(51) Int. Cl.
*F16H 37/00* (2006.01)
*B60K 6/387* (2007.10)
(Continued)

(52) U.S. Cl.
CPC ............... *B60K 6/387* (2013.01); *B60K 6/36* (2013.01); *B60K 6/48* (2013.01); *B60K 6/543* (2013.01);
(Continued)

(58) Field of Classification Search
CPC . B60K 6/387; B60K 6/36; B60K 6/48; B60K 6/543; F16H 37/021; F16D 11/14; F16D 23/14
(Continued)

(56) References Cited

U.S. PATENT DOCUMENTS 6,811,010 B1 11/2004 Armstrong
7,594,869 B2 * 9/2009 Holmes .................. B60K 6/365
192/55.4

(Continued)

FOREIGN PATENT DOCUMENTS

| BE | 1011629 A7 | 11/1999 |
| EP | 1925486 A1 | 5/2008 |
| EP | 2216567 A2 | 8/2010 |
| EP | 2842781 A1 | 3/2015 |

OTHER PUBLICATIONS

International Search Authority, "International Search Report and Written Opinion from PCT Application No. PCT/US2017/039482 filed Jun. 27, 2017", from Foreign Counterpart to U.S. Appl. No. 15/634,512, dated Dec. 5, 2017, pp. 1-22, Published in: WO.

(Continued)

*Primary Examiner* — William C Joyce
(74) *Attorney, Agent, or Firm* — Fogg & Powers LLC

(57) ABSTRACT

A hybrid driveline assembly that includes a mode clutch, a driving member and a mode clutch shift fork is provided. The mode clutch dog has a first portion that is selectively coupled to a rotation of a first shaft. The first shaft is coupled to receive torque from a first type of motor. The mode clutch dog further has a second portion that is coupled to a rotation of a second shaft. The second shaft is coupled to receive torque from a second different type of motor. The driving member has a first end that is selectively coupled to the mode clutch dog to selectively lock rotation of the driving member with rotation of the mode clutch dog. The driving member further includes at least one gear. The mode clutch shift fork is engaged with the mode clutch dog to selectively manipulate a position of the mode clutch dog.

19 Claims, 22 Drawing Sheets

(51) Int. Cl.
- *B60K 6/36* (2007.10)
- *B60K 6/48* (2007.10)
- *B60K 6/543* (2007.10)
- *F16D 11/14* (2006.01)
- *F16D 23/14* (2006.01)
- *F16H 37/02* (2006.01)
- *F16H 63/18* (2006.01)
- *F16H 63/32* (2006.01)
- *F16H 63/30* (2006.01)

(52) U.S. Cl.
CPC .............. *F16D 11/14* (2013.01); *F16D 23/14* (2013.01); *F16H 37/021* (2013.01); *B60K 2006/4816* (2013.01); *B60K 2006/4825* (2013.01); *B60Y 2200/92* (2013.01); *F16D 2023/141* (2013.01); *F16H 63/18* (2013.01); *F16H 2063/3093* (2013.01); *F16H 2063/325* (2013.01); *Y02T 10/62* (2013.01); *Y10S 903/909* (2013.01); *Y10S 903/914* (2013.01); *Y10S 903/918* (2013.01); *Y10S 903/919* (2013.01)

(58) Field of Classification Search
USPC .......................................................... 74/661
See application file for complete search history.

(56) References Cited

U.S. PATENT DOCUMENTS

| | | | | |
|---|---|---|---|---|
| 7,785,221 | B2* | 8/2010 | Steinwender | B60K 6/365 |
| | | | | 475/5 |
| 8,499,867 | B2* | 8/2013 | Marcacci | B60K 6/38 |
| | | | | 180/65.285 |
| 8,911,315 | B2* | 12/2014 | Kaltenbach | B60K 6/365 |
| | | | | 475/4 |
| 2013/0240317 | A1* | 9/2013 | Mori | F16D 11/14 |
| | | | | 192/69.8 |
| 2014/0007740 | A1* | 1/2014 | Takahashi | B60K 6/445 |
| | | | | 74/665 A |
| 2014/0031158 | A1* | 1/2014 | Hemphill | B60W 20/10 |
| | | | | 475/5 |
| 2015/0107955 | A1* | 4/2015 | Tronnberg | F16D 11/10 |
| | | | | 192/69.8 |

OTHER PUBLICATIONS

International Search Authority, "Invitation to Pay Additional Fees and, where Applicable, Protest Fee from PCT Application No. PCT/US2017/039482 filed Jun. 27, 2017", from Foreign Counterpart of U.S. Appl. No. 15/634,512, dated Oct. 4, 2017, pp. 1-15, Published in: WO.

* cited by examiner

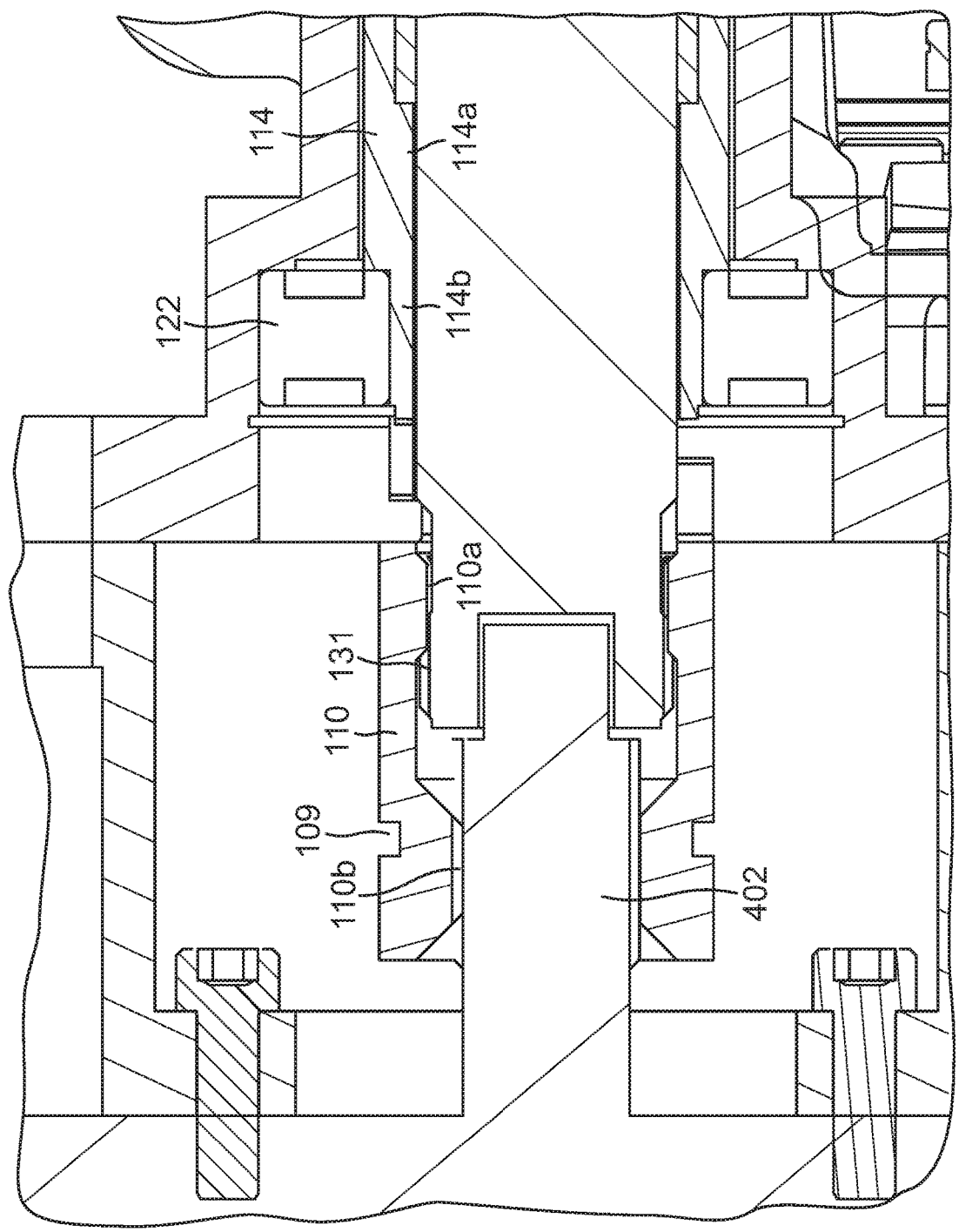

HYBRID DRIVELINE ASSEMBLY

CROSS-REFERENCE TO RELATED APPLICATIONS

This Application claims priority to U.S. Provisional Application Ser. No. 62/355,048, same title herewith, filed on Jun. 27, 2016, which is incorporated in its entirety herein by reference.

BACKGROUND

There is a desire to move away from internal combustion engines for several reasons including a desire to reduce pollution. One alternative power source for a vehicle that has gain popularity is an electrical motor. As batteries are being developed that are more efficient at storing and holding charge, the use of electrical motors has become feasible. However, current batteries that provide enough energy to power a vehicle over significant distances are currently expensive. One alternative that helps reduce the amount of fossil fuels needed to propel a vehicle while taking advantage of electric power is a hybrid power vehicle. A hybrid power vehicle may be powered by an internal combustion engine (ICE), an electric motor, or some combination of both simultaneously. The effectiveness and efficiency of a hybrid powered vehicle may be affected by the then current operating conditions of the vehicle. Moreover, in some driving situations it is desired to employ one system over another. Other reasons for the use of a hybrid system include, but are not limited to, under certain conditions it is desirable to reduce noise by not having a the ICE running and having the ability to utilize the system as a generator may be desirable in certain situations.

SUMMARY

The following summary is made by way of example and not by way of limitation. It is merely provided to aid the reader in understanding some of the aspects of the subject matter described herein. Embodiments provide a hybrid driveline assembly that allows for a plurality of different operation modes in an effective and efficient manner.

In one embodiment, a hybrid driveline assembly is provided. The hybrid driveline assembly includes a mode clutch, a driving member and a mode clutch shift fork. The mode clutch dog has a first portion that is configured and arranged to be selectively coupled to a rotation of a first shaft. The first shaft is coupled to transfer torque from a first type of motor. The mode clutch dog further has a second portion that is configured and arranged to be selectively coupled to a rotation of a second shaft. The second shaft is coupled to transfer torque from a second different type of motor. The driving member has a first end that is configured to be selectively coupled to the mode clutch dog to selectively lock rotation of the driving member with rotation of the mode clutch dog. The driving member further includes at least one gear. The mode clutch shift fork is engaged with the mode clutch dog to selectively manipulate a position of the mode clutch dog to control the selectively coupling of the mode clutch dog to the first shaft, the second shaft and the driving member.

In another example embodiment, another hybrid driveline assembly is provided that includes an input shaft, an electric motor shaft, a mode clutch dog, a driving member and a mode clutch shift fork. The input shaft is coupled to transfer engine torque from an internal combustion engine. The electric motor shaft is coupled to transfer electric motor torque from an electric motor. The mode clutch dog has a first portion that is configured to be selectively coupled to the rotation of the input shaft and a second portion that is selectively coupled to the electric motor shaft. The driving member is received around the input shaft. The driving member is configured to be selectively coupled to rotation of the mode clutch dog. Moreover, the driving member has at least one gear. The mode clutch shift fork is engaged with the mode clutch dog to selectively manipulate a position of the mode clutch dog to control the selectively coupling of the mode clutch dog to the input shaft, the electric motor shaft and the driving member.

In yet another embodiment, a vehicle including an internal combustion engine, a continuously variable transmission, an input shaft, an electric motor, a mode clutch assembly and a final drive train assembly is provided. The internal combustion engine provides engine torque. The continuously variable transmission includes a drive clutch and a driven clutch. The drive clutch is coupled to transfer the engine torque from the internal combustion engine. The driven clutch is configured to be in rotational communication with the drive clutch. The input shaft is rotationally coupled to the driven clutch. The electric motor is used in part to generate electric motor torque. The electric motor has an electric motor shaft. The mode clutch assembly includes a mode clutch dog and a mode clutch shift fork. The mode clutch dog has a first portion that is configured to be selectively coupled to the rotation of the input shaft and a second portion that is selectively coupled to the electric motor shaft. The mode clutch shift fork is engaged with the mode clutch dog to selectively manipulate a position of the mode clutch dog to control the selectively coupling of the mode clutch dog to the input shaft and the electric motor shaft. The final drive train assembly is coupled to at least one output of a transmission. The final drive assembly is configured to use torque received from the transmission to propel the vehicle.

BRIEF DESCRIPTION OF THE DRAWINGS

Embodiments can be more easily understood and further advantages and uses thereof will be more readily apparent, when considered in view of the detailed description and the following Figures in which:

FIG. 11A is a partial close up side view of the mode clutch assembly in a second mode position of an exemplary embodiment;

In accordance with common practice, the various described features are not drawn to scale but are drawn to emphasize specific features relevant to the subject matter described. Reference characters denote like elements throughout Figures and text.

DETAILED DESCRIPTION

Figure 1:
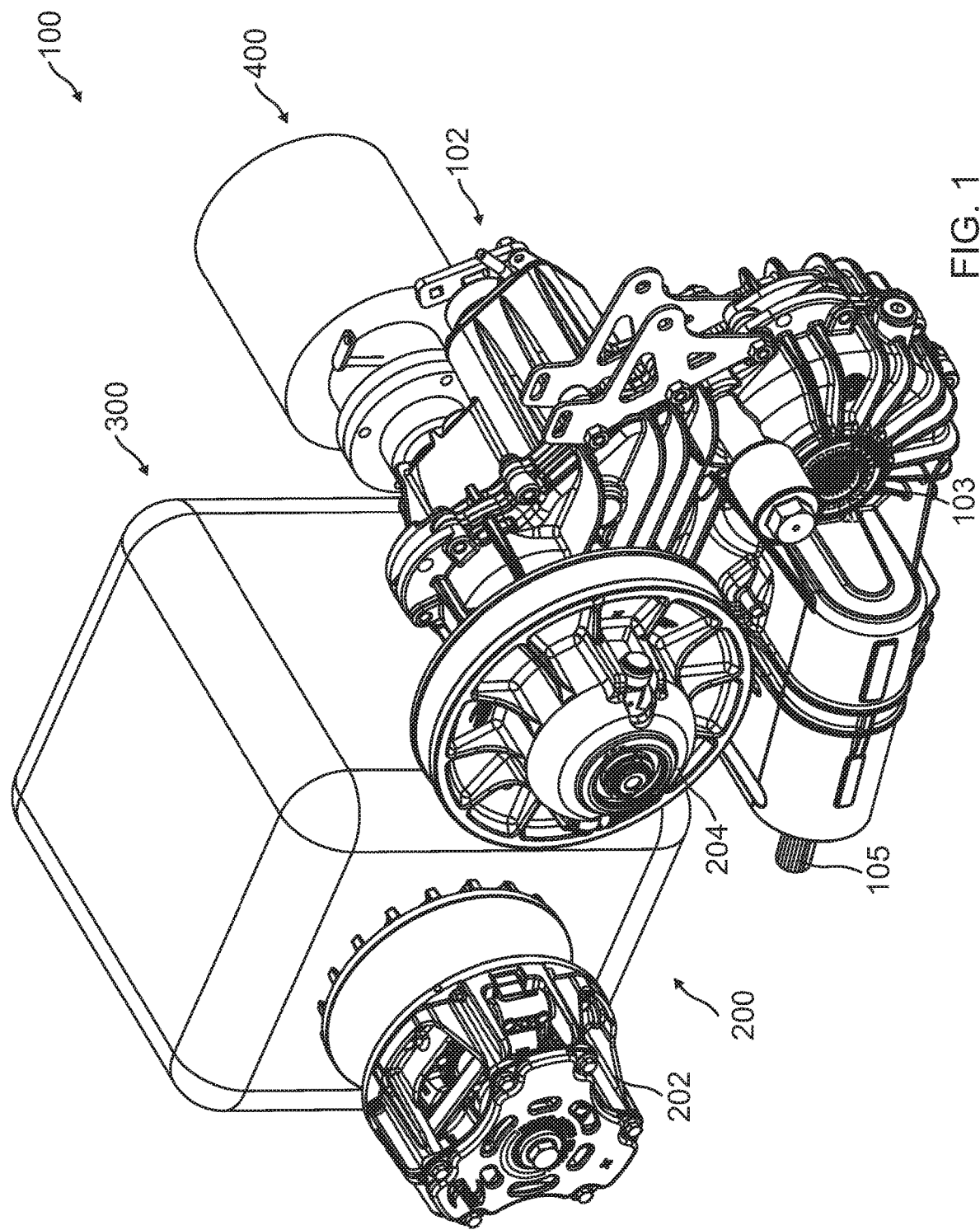
FIG. 1 is a side perspective view of a hybrid system according to one exemplary embodiment.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a hybrid driveline assembly. In embodiments, the hybrid driveline assembly may provide drive power (torque) to one or more tires, tracks, propellers, etc., in a drive train via an internal combustion engine (ICE) or electric motor, or some combination of both simultaneously. In drivelines common to all terrain vehicles (ATV) and utility task vehicles (UTV) or even certain on-road applications, belt driven CVT systems are used to transmit power from ICE to transmission. However, embodiments of the hybrid driveline assembly can be applied to any type of vehicle implementing a hybrid system. Moreover, in an embodiment an operating mode allows the engine torque to be sent directly to the electric motor, which in turn acts as a generator, rather than sending the engine torque to the final drivetrain assembly including the tires, tracks, etc.

Some CVT systems have "tight belt" or "engine braking" designs to keep the CVT belt coupled between drive and driven pulleys, even when the ICE is off, or at idle. To simply couple an electric motor to this driveline to provide an electric-only mode to send power to the tires would mean the CVT and engine would also be driven. This creates extra drag load on the electric motor, reducing efficiency, plus it also means the CVT belt is being subjected to wear and/or slippage that could damage it. CVT belt noise could also be an undesirable effect. To address these issues embodiments employ a mode clutch assembly between engine and transmission to allow the CVT system to be disengaged from the rest of the driveline during electric-only operation. In some embodiments the mode clutch assembly is separate from the transmission and in other embodiments it is integrated into the transmission.

In embodiments, an electric motor may be used to drive the vehicle in electric mode and may also be used as a generator when driven by the ICE. This allows the ICE to be used to charge the batteries while the vehicle is at rest, or during normal driving. It also allows regenerative braking where the motor creates a load to help slow down the vehicle. Instead of energy being converted to heat in the brakes, it is converted to electric energy stored in the battery. The transmission used in embodiments may be a multispeed transmission having plurality of gears . . . first, second, third, fourth, etc. In an embodiment where the transmission is a multispeed transmission, the engine torque path goes through a clutch connecting the engine's crankshaft to the transmission input shaft. The transmission may also be a transfer case type of gearbox that selects ranges such as High, Low, Reverse, etc. In CVT driveline, the "transmission" is typically a combination of "range box" and transfer case.

Embodiments employ a plurality of different modes. For example, the modes may include an electric-only mode, a hybrid mode, a charge-at-rest mode and an ICE-only mode. In the electric-only mode, only electric power via the electric motor is used to propel the vehicle. This allow for emission free operation and reduced noise. Moreover, the CVT and engine are decoupled to reduce drag, wear, and noise. In the hybrid mode, both the ICE and electric motor are coupled to the driveline and used to propel vehicle. Since electric motor is coupled to driveline/tire, regenerative type braking can be used to charge batteries. Since the electric motor is also coupled to ICE, power from the ICE may be used to drive the electric motor during vehicle operation to provide "charge while driving". The electric motor could also provide extra power to help the ICE in this mode. In the charge-at-rest mode, the ICE is allowed to send power to the electric motor, but not through the rest of the driveline to the tires. This allows batteries to be charged, or to use the vehicle as a generator to power external devices. In the ICE-only mode, the electric motor is decoupled to maximize efficiency of power transfer from ICE to the drive train which may include wheels.

FIG. 1 illustrates a hybrid system 100 of an example embodiment. The hybrid system includes an ICE 300 and an electric motor 400 both configured to provide torque to a transmission 102. The ICE 300 provides engine torque to the transmission 102 via a continuously variable transmission (CVT) 200. In embodiments, the transmission 102 is designed to selectively transfer torque generated by the ICE 300 and electric motor 400 to a final drivetrain assembly of a vehicle. The CVT 200 includes a drive clutch 202 that is rotationally coupled to receive engine torque from the ICE 300. The torque is transferred to a driven clutch 204 of the CVT 200 via belt (not shown). The driven clutch 204 is coupled to provide engine torque to the transmission 102. The electric motor 400 is also coupled to provide electric motor torque to the transmission. Embodiments of the transmission selectively use the engine torque and/or electric motor torque to provide torque to the final drivetrain assembly via transmission output 103 and transmission output 105 in this example embodiment.

Figure 2:
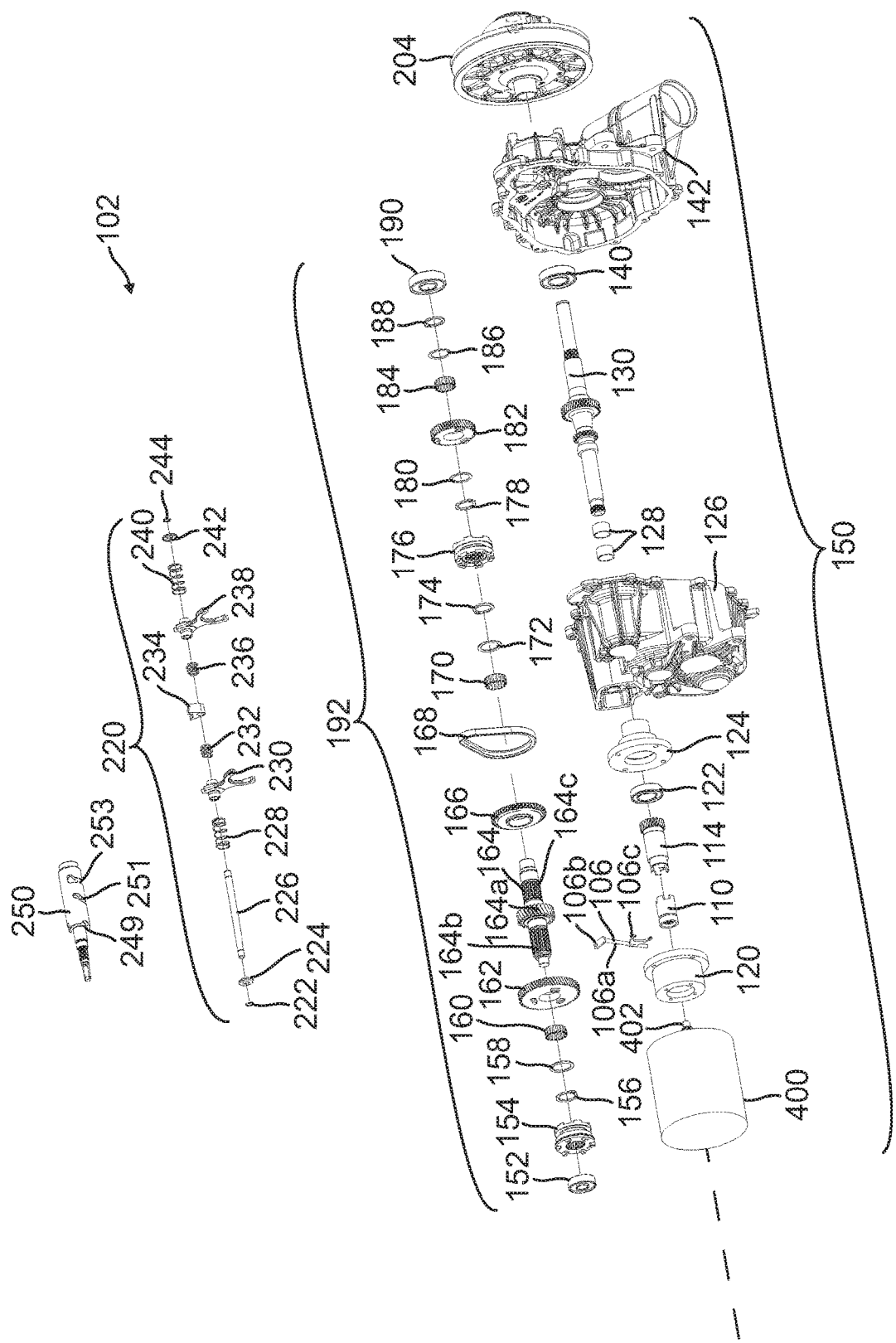
FIG. 2 is an exploded side perspective of a transmission of one exemplary embodiment.

FIG. 2 illustrates an exploded view of portions of the transmission 102 that are relevant to embodiments. The portions of the transmission 102 are grouped into torque generation and connection portion 150, countershaft assembly 192, gear shift assembly 220 and a shift drum 250 for illustration purposes. The torque generation and connection portion 150 includes the electric motor 400 and the driven clutch 204 which, as discussed above, provides engine torque to the transmission 102. The torque generation and connection portion 150 further includes a first gear case housing portion 126 and a second gear case housing portion 142 that are coupled together to form a gear case housing of the transmission 102. The torque generation and connection portion 150 also includes a first motor mount adapter portion 120 and a second motor mount adaptor portion 124 which are coupled together. At least parts of a mode clutch assembly including a mode clutch shift fork 106, a mode clutch dog 110, bearing 122 and a low gear driving member 114 are received within the first motor mount adapter portion 120 and the second motor mount adaptor portion 124. In another embodiment where the mode clutch assembly is integrated into a gear case housing the first and second motor mount adaptor portion 120 and 124 are not used. The torque generation and connection portion 150 also includes an input shaft 130. Mounted, on the input shaft 130 are the driving member 114, bearing 122, low gear support bearings 128 and bearing 140.

The countershaft assembly 192 includes a countershaft 164. The countershaft 164 includes a central countershaft gear 164a and a first set of splines 164b and second set of splines 164c. Mounted on a first side of the countershaft assembly 164 is a low driven member gear 162 with a needle bearing 160, a washer 158 and a retaining ring 156. The retaining ring 156 retains the low driven member gear 162 at a select location in relation to the countershaft 164. A low/park shift dog 154 has internal splines that receive the first set of splines 164b that lock rotation of the low/park shift dog 154 with the countershaft 164 while allowing axial movement of the low/park shift dog 154 along the countershaft 164. This allows the low/park shift dog to selectively engage the low driven member gear 162. Further mounted on the countershaft on this side is bearing 152. On the other side of the countershaft gear 164a is mounted a reverse sprocket gear 166 and needle bearing 170 that are retained in a static location in relation to the countershaft 164 via washer 172 and retaining ring 174. Further mounted on this side of the countershaft 164 is a high gear 182 and needle bearing 184. The high gear 182 is held in a static location on the countershaft 164 via washers 180, 186 and retaining rings 178 and 188. Mounted on the countershaft 164 between the reverse sprocket gear 166 and the high gear 182 is a high/reverse shift dog 176. The high/reverse shift dog 176 has interior splines that receive the second set of splines 164c on the countershaft 164 to lock rotation of the high/reverse shift dog 176 while allowing axial movement of the high/reverse shift dog 176 in relation to the countershaft 164 to allow the high/reverse shift dog to selectively engage one of the reverse sprocket gear 166 and the high gear 182. Also mounted on this end of the countershaft 164 is bearing 190. Bearings 152 and 190 are positioned to engage the first gear case housing portion 126 and a second gear case housing portion 142.

Figure 3:
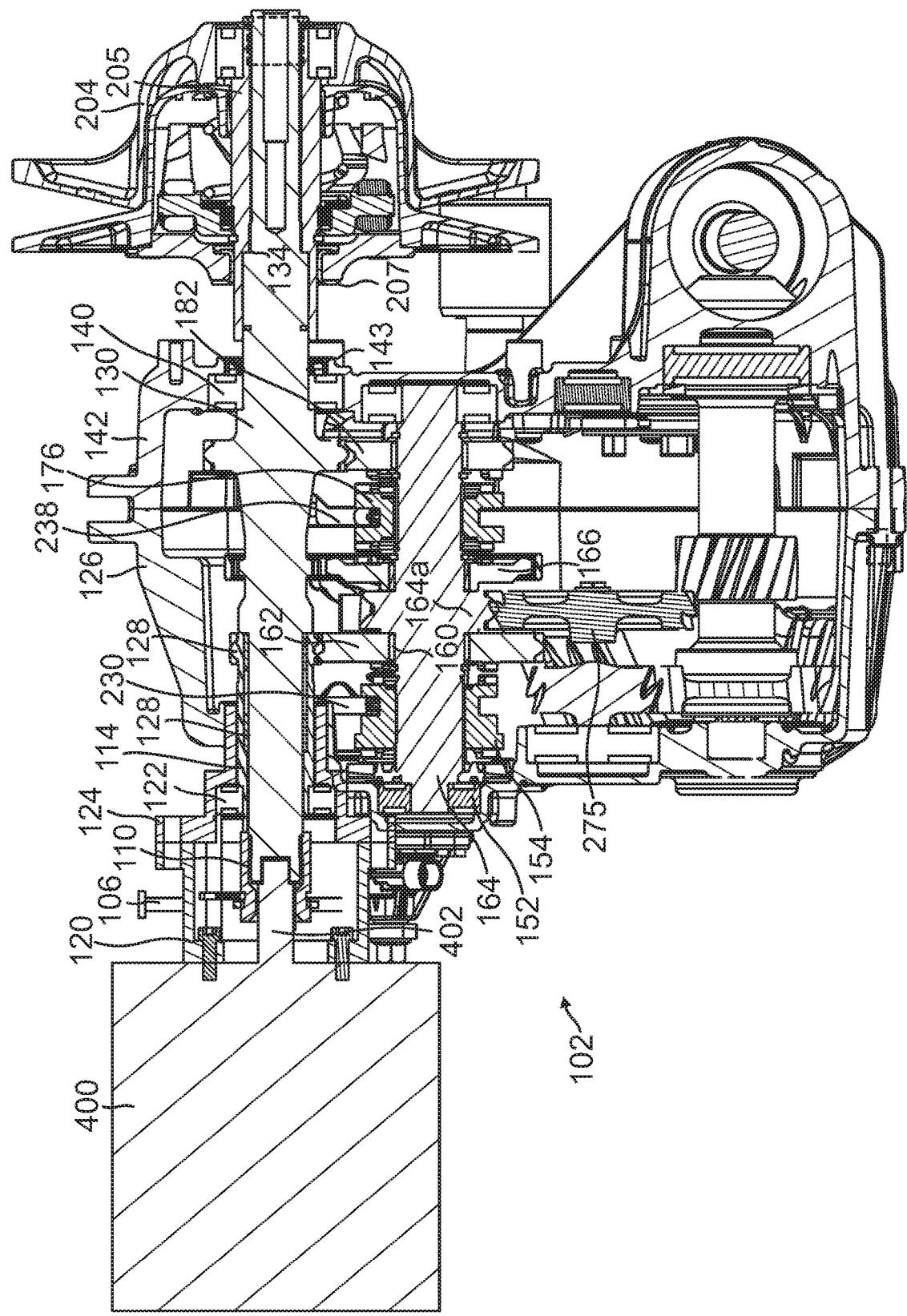
FIG. 3 is a cross-sectional side view of a transmission, electric motor and driven clutch of one exemplary embodiment.

The gear shift assembly 220 includes a shift rail 226 upon which is mounted a retaining ring 222, a washer 224, a first biasing member 228, a first shift fork 230, a second biasing member 232, a shift collar 234, a third biasing member 236, a second shift fork 238, a forth biasing member 240, a washer 242 and a retaining ring 244. The first shift fork 230 is engaged with the low/park shift dog 154 such that when the first shift fork 230 moves, the low/park shift dog 154 moves by sliding axially along the countershaft 164. The second shift fork 238 engages the high/reverse shift dog 176 such that when the second shift fork 238 moves, the high/reverse shift dog 176 moves by sliding axially along the countershaft 164. Movement of the shift forks 230 and 238 is controlled by the shift drum 250. The shift drum 250 includes cam tracks 249, 251 and 253 upon which follower portions of the shift forks 230 and 238 and the shift collar 234 engage. Shifting is accomplished by rotating the shift drum 250. This causes the followers in the cam tracks to selectively move the shift forks 230 and 238 and the shift collar 234 to accomplish a desired shift. A cross sectional assembled view of the transmission 102 is illustrated in FIG. 3. Although the mode clutch assembly of embodiments are illustrated as a separate subassembly outside of the main body of the transmission, in other embodiments the mode clutch assembly and actuation means are packaged inside the transmission as mentioned above.

Figure 4:
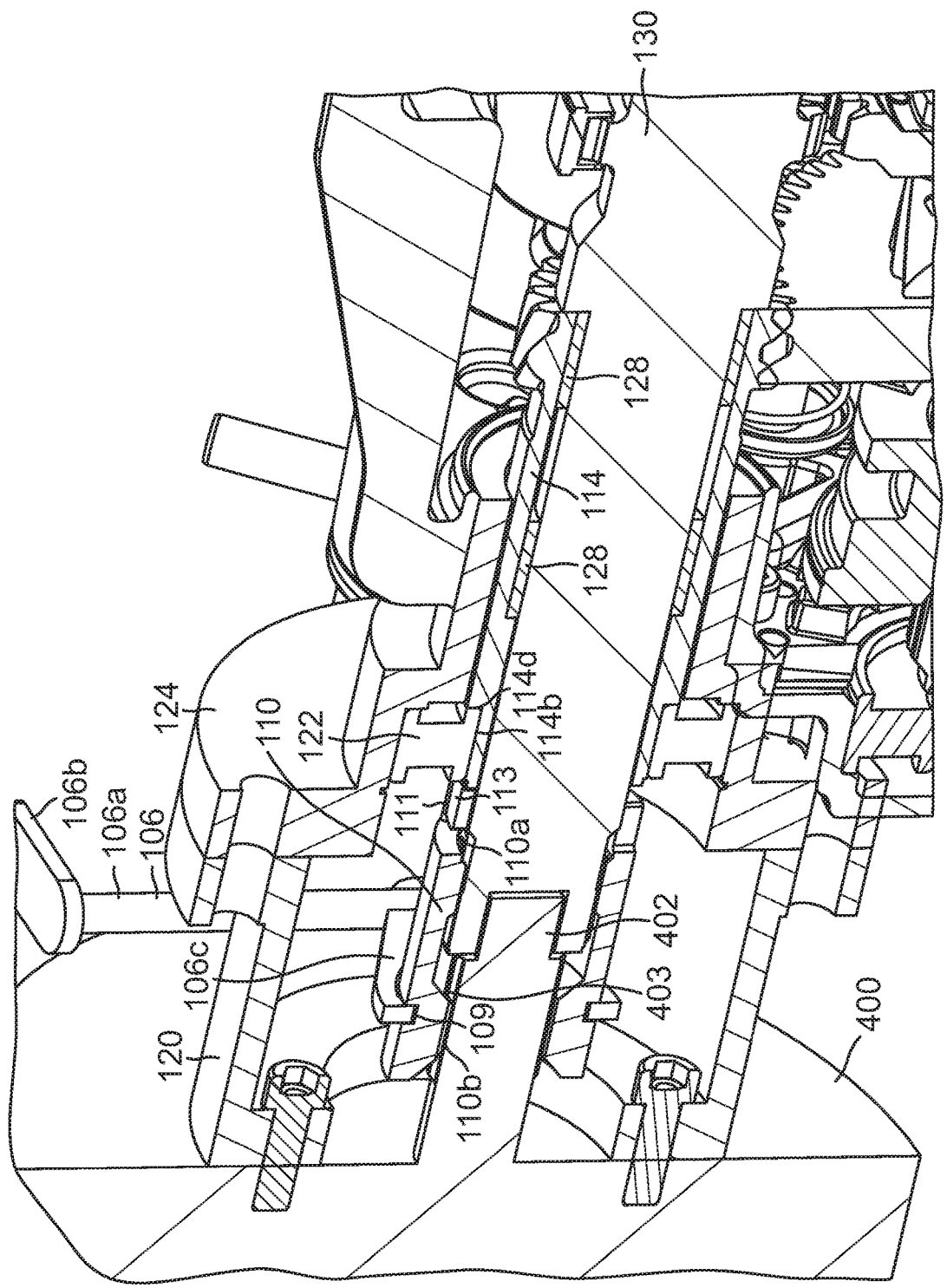
FIG. 4 is a partial close up cross-sectional side perspective view of a mode clutch assembly of one exemplary embodiment.
Figure 5:
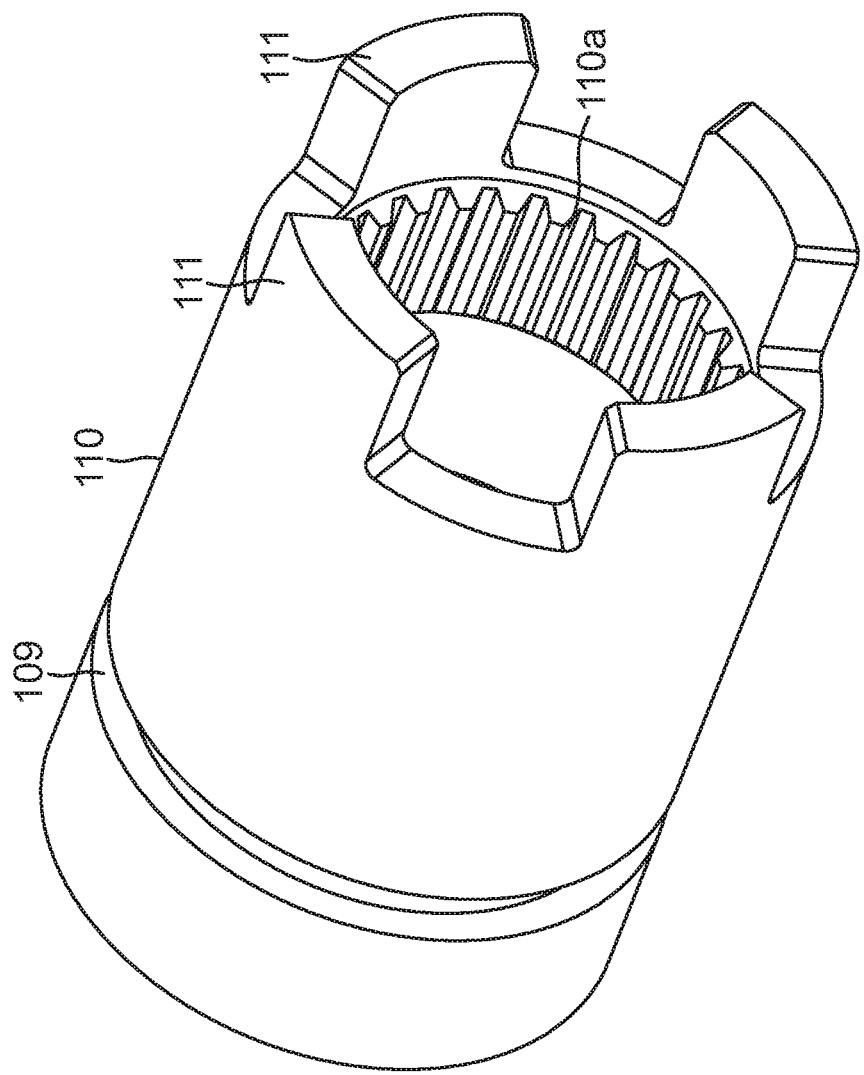
FIG. 5 is a side perspective view of a mode clutch dog of one exemplary embodiment.
Figure 6:
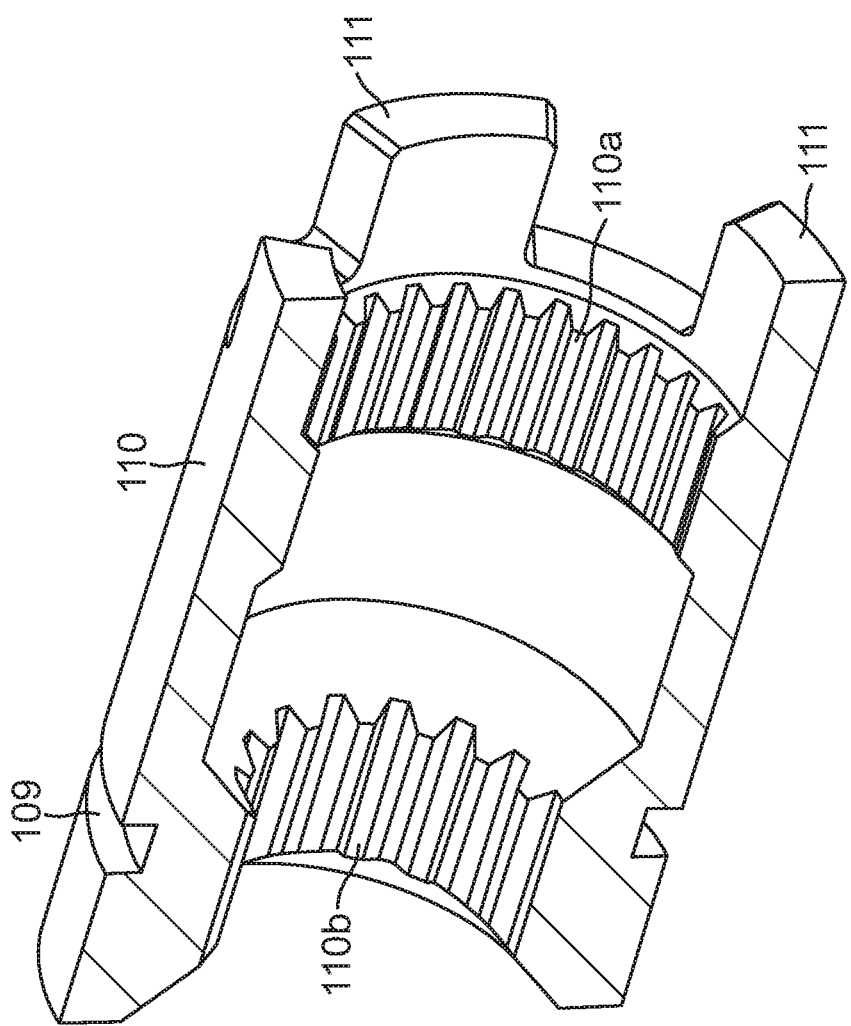
FIG. 6 is a cross-sectional side perspective view of the mode clutch dog of FIG. 5.

FIG. 4 illustrates a close up cross-sectional view of components of a mode clutch assembly that include the mode clutch dog 110, the driving member 114 and the mode clutch shift fork 106. The configuration of the mode clutch dog 110 in this example embodiment is best illustrated in FIGS. 5 and 6. The mode clutch dog 110 is generally cylindrical in shape. The mode clutch dog 110 includes a shift fork engaging groove 109 formed around a circumference of the mode clutch dog proximate a second end of the mode clutch dog 110. Spaced mode clutch dog teeth 111 extend from a first end of the mode clutch dog 110. The interior surface of the mode clutch dog 110 includes a first set of interior splines 110a proximate the first end of the mode clutch dog 110 and a second set of interior splines 110b proximate the second end of the mode clutch dog 110. As illustrated in FIG. 4, the mode clutch dog 110 receives an end of the input shaft 130 in the first end of the mode clutch dog 110 and an end of an electric motor shaft 402 of the electric motor 400 in the second end of the mode clutch dog 110. The second set of interior splines 110b of the mode clutch dog 110 are selectively engaged with exterior splines 403 of the electric motor shaft 402 to lock rotation of the mode clutch dog 110 to the rotation of the electric motor shaft 402 of the electric motor 400. In another embodiment, a jaw clutch teeth arrangement is used to selectively lock rotation of the mode clutch dog 110 to the electric motor shaft 402. The first set of interior splines 110a of the mode clutch dog 110 are selectively engaged with splines 131 of the input shaft 130 (best illustrated in FIG. 9). The mode clutch dog 110 as discussed below moves axially in relation to the electric motor shaft 402 and the input shaft 130 to various positions that connect various combination of elements depending on the mode.

Figure 8:
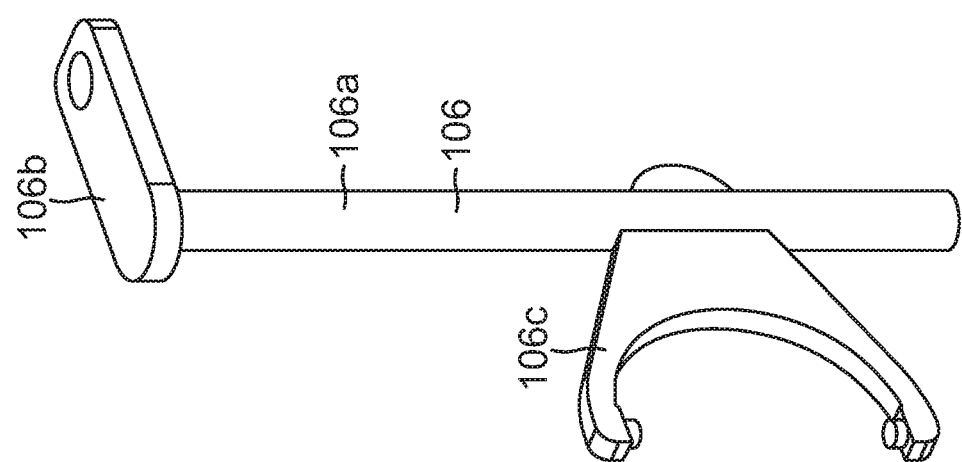
FIG. 8 is a side perspective view of a mode clutch shift fork of one exemplary embodiment.

Arms of an engagement portion 106c of the mode clutch shift fork 106 are received within the shift fork engaging groove 109 of the mode clutch dog 110. The mode clutch shift fork 106 is best illustrated in FIG. 8. As illustrated, the mode clutch shift fork 106, in this example embodiment, includes a clutch shift shaft 106a. Extending from the clutch shift shaft 106a of the mode clutch shift fork 106 is an engagement portion 106c with arms. Each arm has a portion that is received in the shift fork engaging groove 109 of the mode clutch dog 110. Attached to an end of the clutch shift shaft 106a is a manipulation portion 106b. The manipulation portion 106b is acted upon by linkage, cable etc. with an activation member, such as, but not limited to, an electric actuator, a hydraulic actuator, solenoid, shift lever, shift drum, etc. In one embodiment, the clutch shift shaft 106a is selectively rotated by the manipulation portion 106b which causes the arms of the engagement portion 106c of the mode clutch shift fork 106 in the engaging groove 109 of the mode clutch dog 110 to axially move the mode clutch dog 110 in relation to the electric motor shaft 402 and the input shaft 130. The mode clutch assembly may be spring loaded to default to a particular end position, or may be coupled to the shift mechanism via spring coupling to allow a spring preload to finish the shift if splines or shift dog teeth do not line up. In another embodiment, the mode clutch dog 110 is moved via a shift fork that slides on a rail, similar to the gear shift assembly 220 arrangement of the shift rail 226 and first and second shift forks 230 and 238 described above in relation to FIG. 2. The mode clutch shift fork 106 in this embodiment, may be moved along the rail via a variety of methods. Hence, in this embodiment, the fork portion 106c of the mode clutch shift fork 106 that engages the mode clutch does not pivot about the shift shaft axis and remains parallel to the mode clutch groove 109 when moving the mode clutch dog 110.

Figure 7:
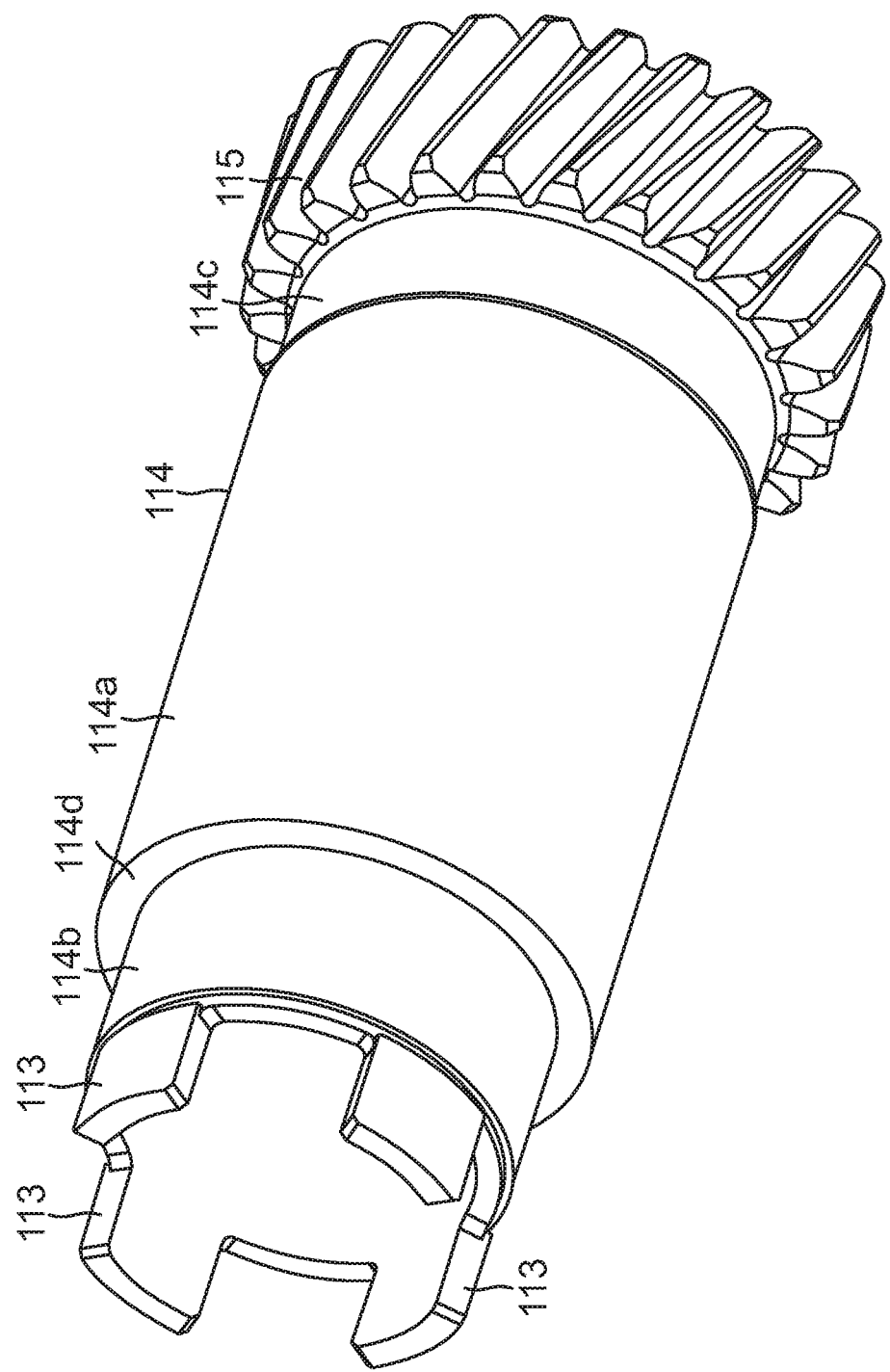
FIG. 7 is a side perspective view of a driving member of one exemplary embodiment.

The driving member is best illustrated in FIG. 7. As illustrated, the driving member 114 is also generally cylindrical in shape having a main body member portion 114a of a select diameter. A first end of the driving member 114 includes spaced driving member teeth 113 that selectively engage the spaced mode clutch dog teeth 111 in a first end of the mode clutch dog 110 to selectively lock rotation of the driving member 114 to the mode clutch dog 110. In another embodiment another spline arrangement is used to selectively couple the driving member 114 to the mode clutch dog 110. Between the spaced driving member teeth 113 and the main body member portion 114a is a second body member portion 114b that has a second diameter. A shoulder 114d is formed between the second body member portion 114b and the main body member portion 114a. A second end of the driving member 114 includes a driving member low gear 115. In one embodiment, this gear is used in an electric only mode. Between the driving member low gear 115 and the main body member portion 114a is a third body member portion 114c. The third body member portion 114c has a third diameter. Referring back to FIG. 4, as discussed above, the driving member 114 is mounted on the input shaft 130. The input bearing 122 is mounted on the second body member portion 114b of the driving engages with a side of the input bearing 122 abutting shoulder 114d of the driving member 114. Another side of input bearing 122 engages the second motor mount adapter portion 124. As further illustrated, the low gear support bearings 128 are positioned between an interior surface of the driving member 114 and the input shaft 130.

Figure 9:
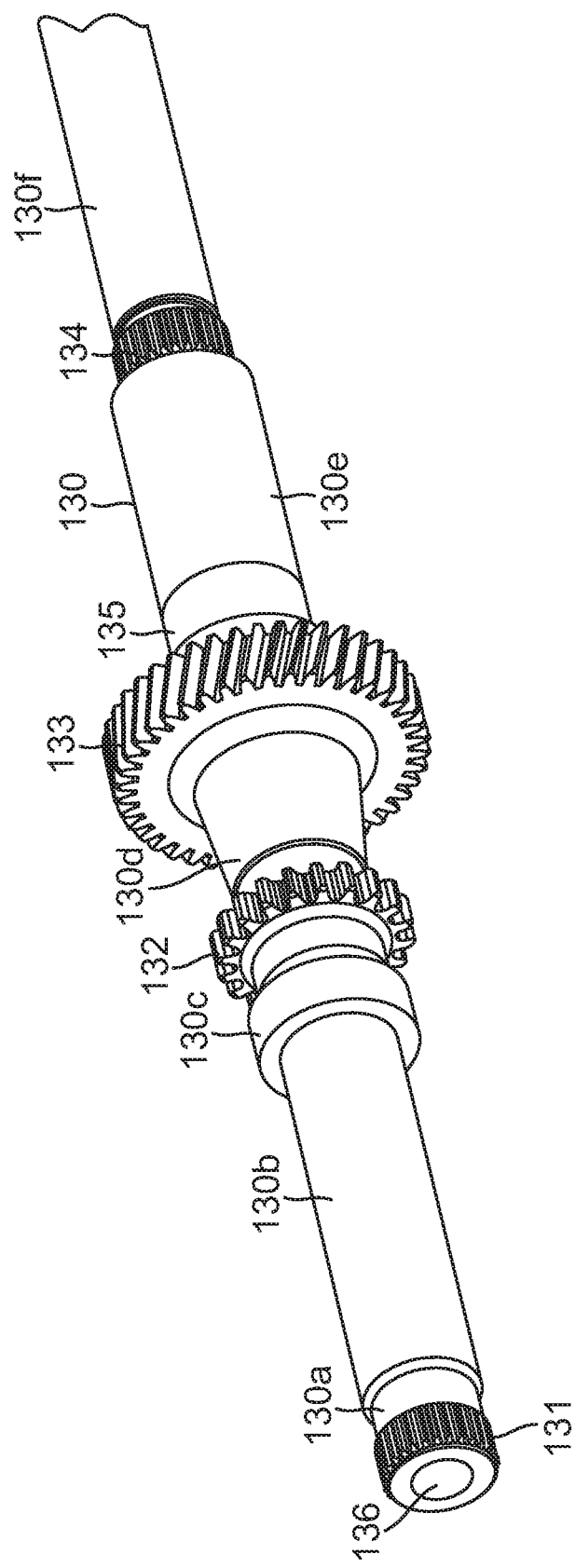
FIG. 9 is a partial side perspective view of an input shaft of one exemplary embodiment.

A partial view of the input shaft is illustrated in FIG. 9. The input shaft 130 has a first end (not shown in FIG. 9) that is coupled to receive torque from the driven clutch 204 of the CVT 200. A second end of the input shaft includes a bore 136 upon which a portion of the electric motor shaft 402 is received. Proximate the second end is are mode engaging splines 131 that selectively engage the first set of interior splines 110a of the mode clutch dog 110. The input shaft 103 further includes a first input shaft portion 130a of a first diameter 130a and a second input shaft portion 130b of a second diameter 130b. The first input shaft portion 130a is positioned between the mode engaging splines 131 and the second input shaft portion 130b. The input shaft 130 further includes an input reverse shaft gear 132. The input reverse shaft gear 132 is engaged with the reverse chain 168 discussed above. Positioned between the input reverse shaft gear 132 and the second input shaft portion 130b is a shoulder member 130c. The second end of the driving member 114 abuts the shoulder member 130c. The input shaft 130 further includes an input shaft high gear 133. The input shaft high gear 133 is engaged with the high gear 182 of the countershaft 164. Positioned between the input shaft high gear 133 and the input shaft first gear 132 is a third transition input shaft portion 130d. The input shaft 130 also includes connection splines 134. The connection splines 134 of the input shaft are engaged with internal splines 207 on a post 205 of the drive clutch 204 (best illustrated in FIG. 3) to lock rotation of the drive shaft 130 with the driven clutch 204. Positioned between the connection splines 134 of the input shaft 103 and the input shaft second gear 133 is a bearing surface 135 and a forth input shaft portion 130e (journal 130e). The bearing surface 135 engages bearing 140. Next to the bearing surface 134 is a seal groove that is designed to seal against journal 130e. Moreover, seal 143 seals against journal 130e. Journal 130e also functions as a pilot journal for the CVT. Groove is a relief for the process used to roll the spline feature 134. Also illustrated in the partial view of the input shaft 130 of FIG. 9 is a fifth input shaft portion 130f The fifth input shaft portion 130f further functions as a pilot journal for the CVT.

Figure 10A:
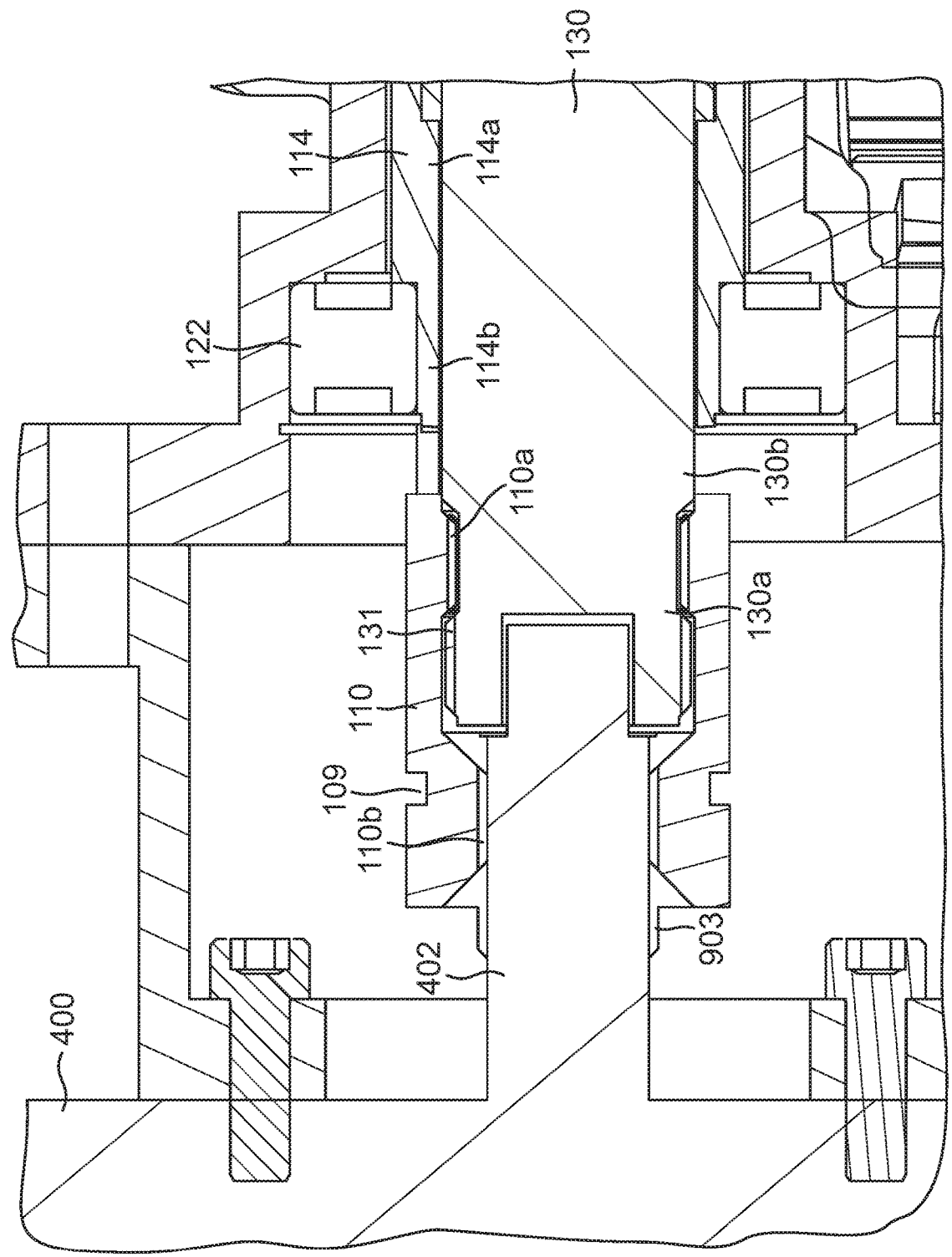
FIG. 10A is a partial close up side view of the mode clutch assembly in a first mode position of an exemplary embodiment.
Figure 10B:
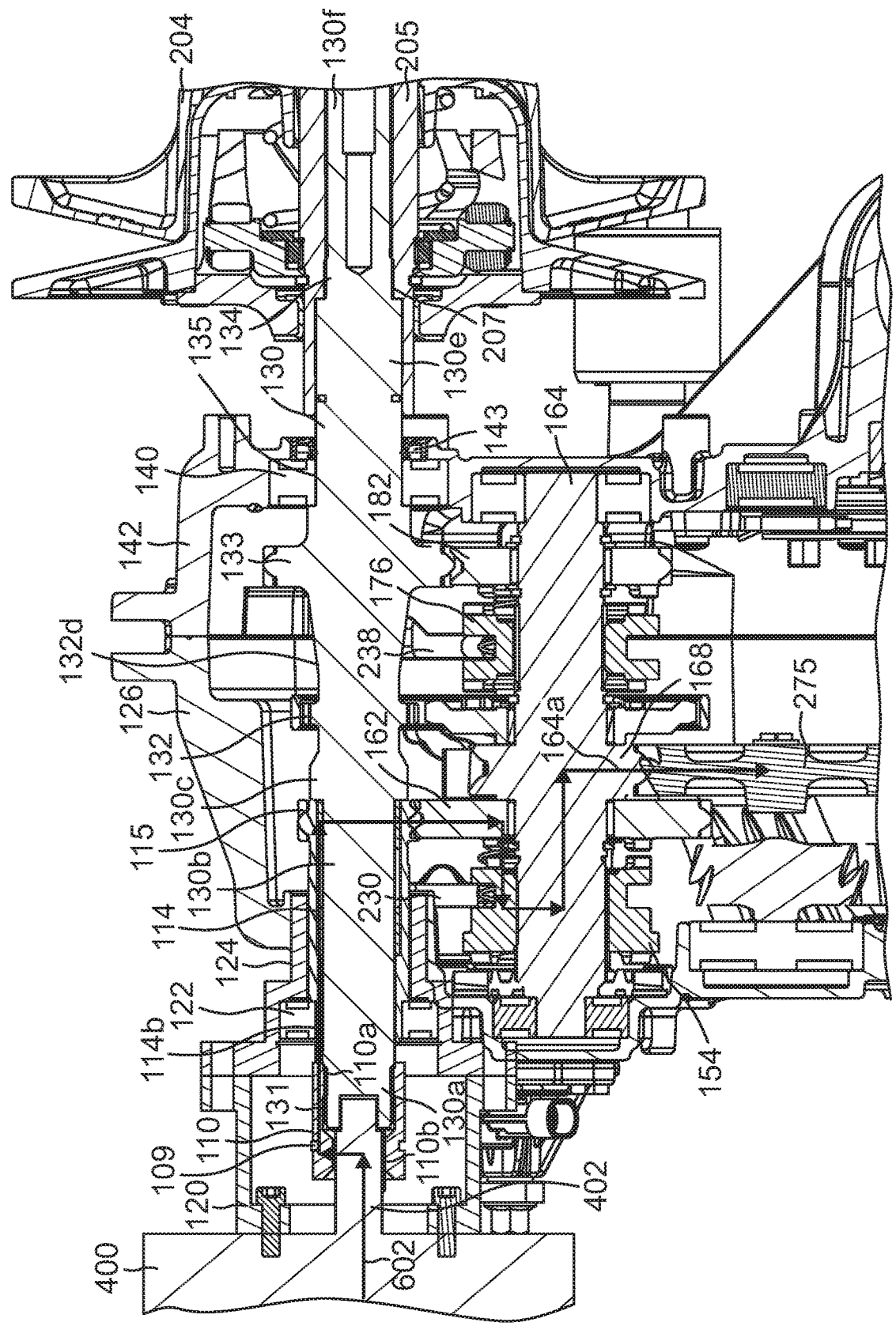
FIG. 10B is a partial cross-sectional side view of a transmission of an exemplary embodiment illustrating a torque path in the first mode.
Figure 10C:
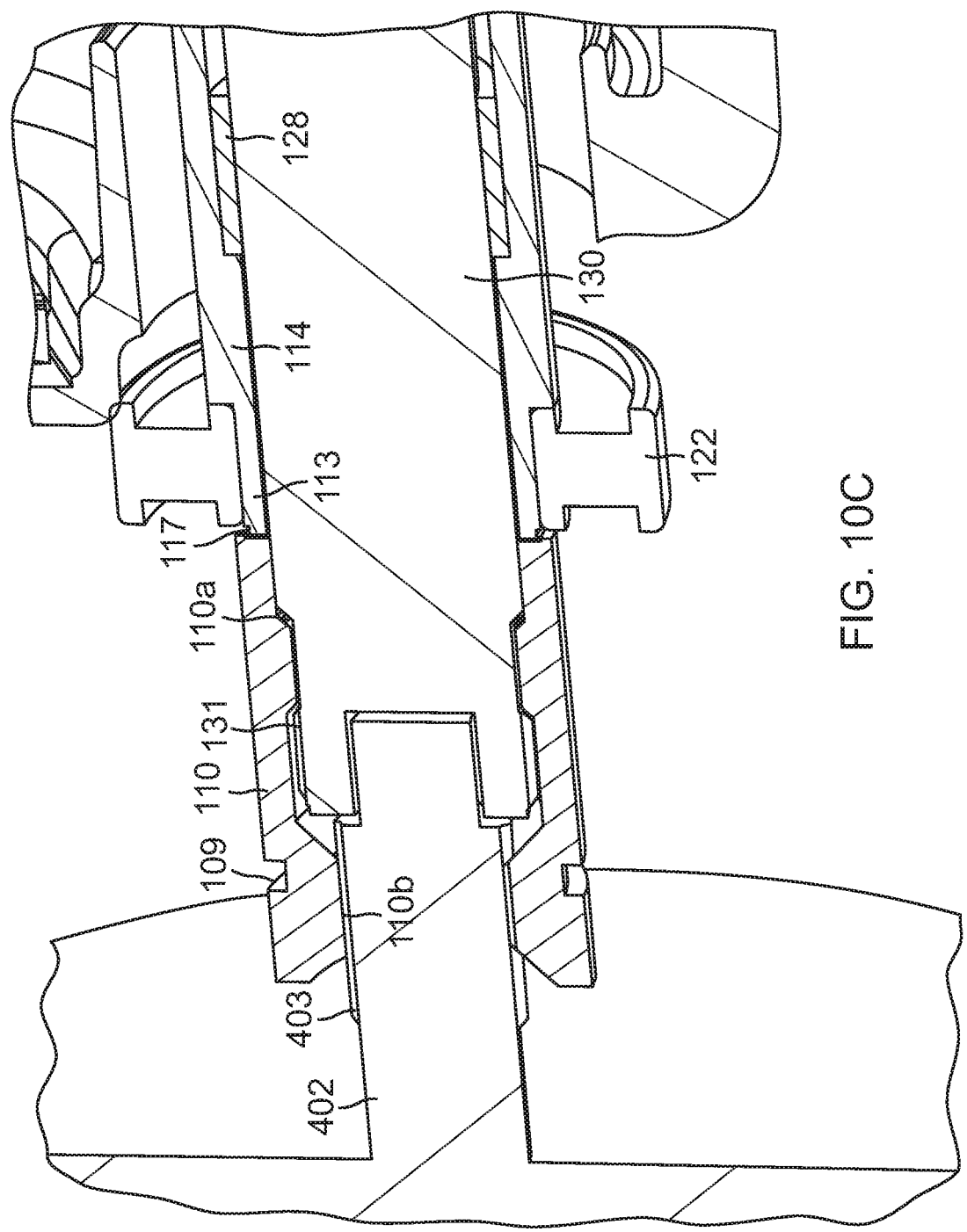
FIG. 10C is a partial close up side perspective view of the mode clutch assembly in the first mode position illustrated in FIG. 10A.

As discussed above, the configuration provides different modes of operation of the hybrid system. A first example electric-only mode is illustrated in FIGS. 10A, 10B and 10C. FIG. 10A illustrates a close up cross-sectional view of components of a mode clutch assembly in the electric-only mode configuration. As illustrated, the second set of splines 110b of the mode clutch dog 110 are coupled to the exterior splines 403 on the electric motor shaft 402 to lock rotation of the mode clutch dog 110 to the rotation of the electric motor shaft 402. Further in this mode, the first set of splines 110a of the mode clutch dog 110 is not engaged with the mode engaging splines 131 of the input shaft 130. Hence, rotation of the mode clutch dog 110 is not locked to the rotation of the input shaft 130. Also in this configuration the spaced mode clutch dog teeth 111 in a first end of the mode clutch dog 110 engage the spaced driving member teeth 113 in the first end of the driving member 114 to selectively lock rotation of the driving member 114 to the mode clutch dog 110. This is further illustrated in the partial cross-sectional side perspective view of FIG. 10C. FIG. 10B is a partial cross-section side view of the transmission illustrating the electric motor torque path 602 in this electric-only mode. As illustrated, the torque is originally generated by the electric motor 400. The torque is then passed from the electric motor shaft 402 to the mode clutch dog 110. From the mode clutch dog, the torque passes to the driving member 114. The driving member low gear 115 of the driving member 114 then passes the torque on the driven member low gear 162 which is rotationally mounted on the counter shaft 164. In this mode, the low/park shift dog 154 is positioned to engage the driven member low gear 162 so the torque is passed through the low/park shift dog 154 to the countershaft 164. The torque is then passed from the central countershaft gear 164*a* of the counter shaft 164 to a transmission gear 275 of the transmission 102. The torque then passes through gearing (gear train) in the transmission 102 to one or more outputs of the transmission. In addition, the torque path may be reversed during situations where the electric motor is used to create braking torque.

Figure 11B:
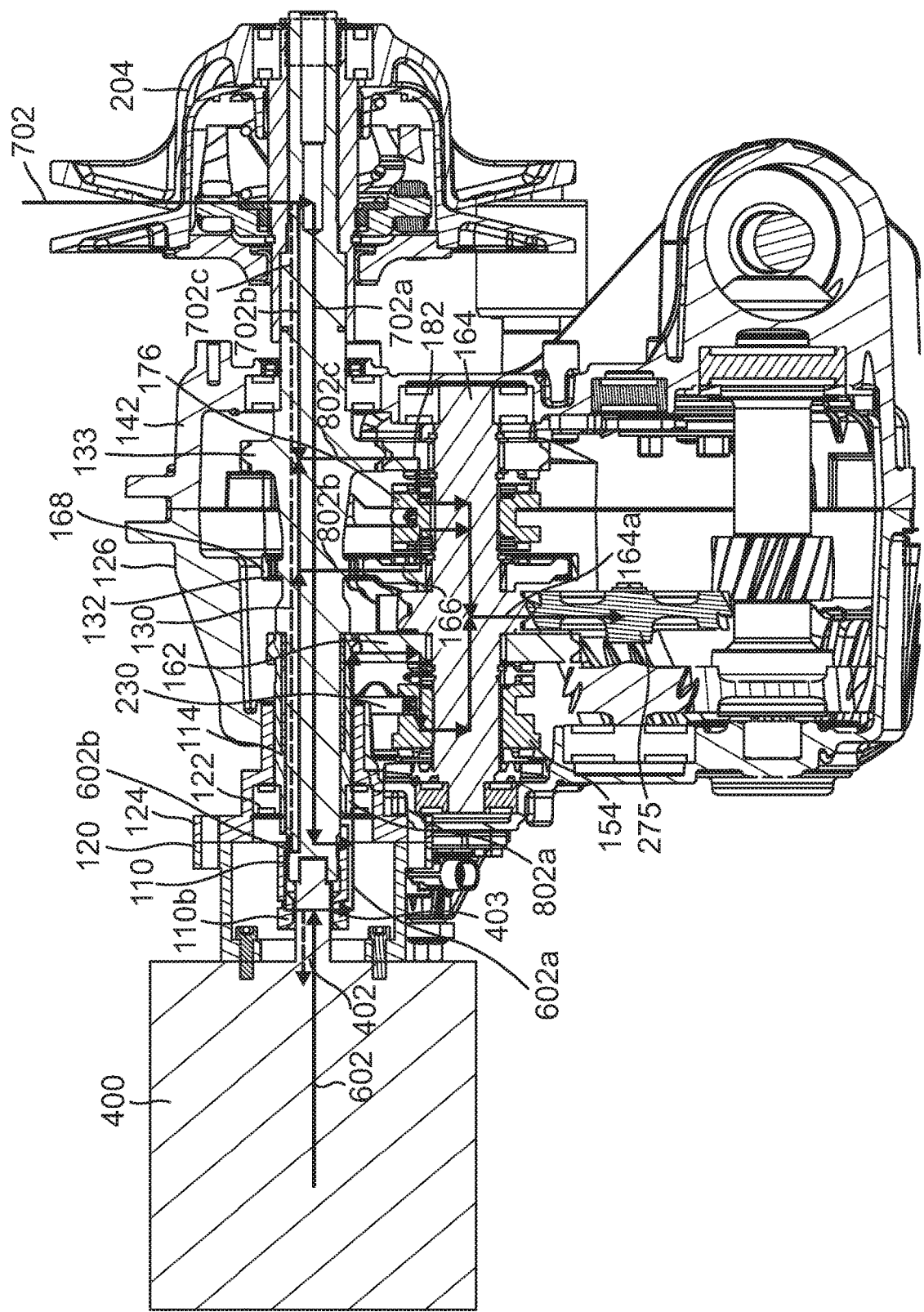
FIG. 11B is a partial cross-sectional side view of a transmission of an exemplary embodiment illustrating torque paths in the second mode.
Figure 11C:
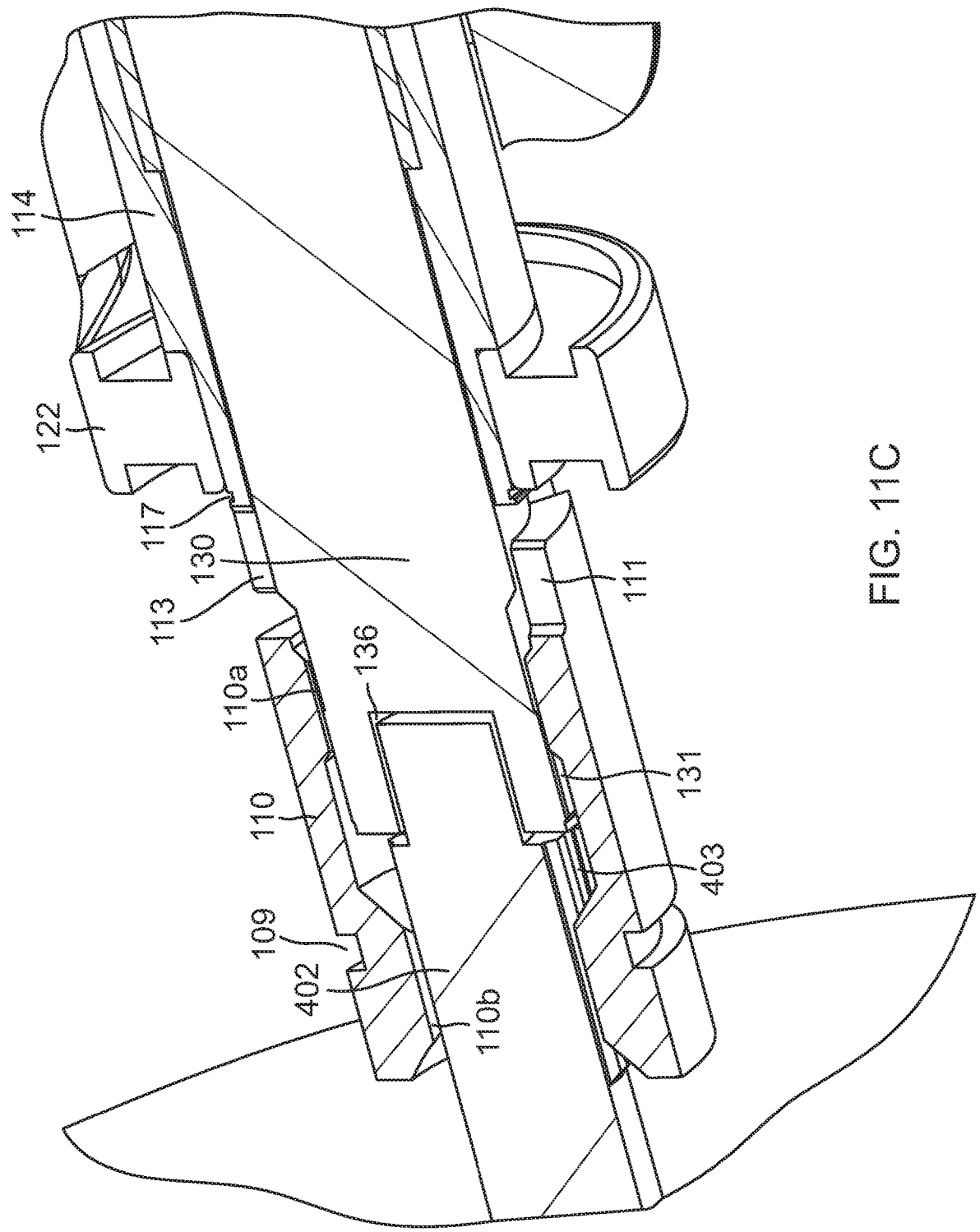
FIG. 11C is a partial close up side perspective view of the mode clutch assembly in the second mode position illustrated in FIG. 11A.

A second example mode is a hybrid mode. The hybrid mode is illustrated in FIGS. 11A, 11B and 11C. FIG. 11A illustrates a close up cross-sectional side view of components of a mode clutch assembly in the hybrid mode configuration. FIG. 11C also illustrates a close up view of the components of the mode clutch assembly in a cross-sectional side perspective view. As illustrated, the second set of splines 110*b* of the mode clutch dog 110 are coupled to the exterior splines 403 on the electric motor shaft 402 to lock rotation of the mode clutch dog 110 to the rotation of the electric motor shaft 402. Further in this mode, the first set of splines 110*a* of the mode clutch dog 110 are engaged (although partially engaged) with the mode engaging splines 131 of the input shaft 130. Hence, rotation of the mode clutch dog 110 is locked to the rotation of the input shaft 130. Also in this configuration, the spaced mode clutch dog teeth 111 in a first end of the mode clutch dog 110 still engage (although partially engage) the spaced driving member teeth 113 in the first end of the driving member 114 to lock rotation of the driving member 114 to the mode clutch dog 110. This is best illustrated in FIG. 11C.

FIG. 11B is a partial cross-section side view of the transmission illustrating the torque paths in this hybrid mode. As illustrated, the torque path of the torque originally generated by the electric motor 400 is generally designated as electric motor torque path 602 and the torque path from torque originally generated by the ICE 300 is generally designated as engine torque 702. The torque indicated by the torque paths are combined into torque paths 802*a*, 802*b* or 802*c* depending on the position of the respective low/park shift dog 154 and the high/reverse shift dog 176 based on the rotational position of the shift drum 250.

The electric motor torque path 602 extends from the electric motor shaft 402 to the mode clutch dog 110. From the mode clutch dog 110, the torque passes to the driving member 114 along electric motor torque path 602*a* and to the drive shaft via electric motor torque path 602*b*. The engine torque path 702 extends from the driven clutch 204 to the input shaft 130. The engine torque is shown as having two paths through the drive shaft 130 for illustration purposes. The first engine torque path 702*a* passes through the drive shaft 130 to the mode clutch dog 110 where it combines with the electric motor torque path 602*a* and is labeled as a first combined torque path 802*a*. The driving member low gear 115 of the driving member 114 passes the combined torque on the driven member low gear 162 rotationally mounted on the counter shaft 164. If the low/park shift dog 154 is positioned to engage the driven member low gear 162, the combined torque is passed through the low/park shift dog 154 to the countershaft 164. The combined torque is then passed from the central countershaft gear 164*a* of the counter shaft to a transmission gear 275 of the transmission 102. The combined torque in the combined path then passes through gear train in the transmission 102 to outputs 103, 105 of the transmission. As with the previous mode, the torque path may be reversed to allow the wheels (or other end propulsion device) to back drive the system for engine braking as desired.

The second engine torque path 702*b* is combined with the second electric motor torque path 602*b* in the drive shaft 130. The combined path either takes a second combined torque path 802*b* through the input reverse shaft gear 132, the reverse chain 168, the reverse sprocket gear 166, the high/reverse shift dog 176 to counter shaft 164 then through the central countershaft gear 164*a* of the counter shaft 164 to the transmission gear 275 of the transmission 102 or a third combined torque path 802*c* through the input shaft second gear 133, high gear 182, high/reverse shift dog 176 to the counter shaft 164 then through the central countershaft gear 164*a* to the transmission gear 275 of the transmission 102. As discussed above, the combined torque path taken 802*a*, 802*b* and 802*c* depends on the positioning of the low/park shift dog 154 and high/reverse shift dog 176 which is controlled by the rotational position of the shift drum 250.

In an embodiment, the torque path during a charge-while-driving condition may occur during operation in any gear position. Engine torque from the ICE 300 may also feedback through the mode clutch to drive the electric motor 400, allowing it operate as a generator if the vehicle application and controller desire this feature. FIG. 11B illustrates third engine torque path 702*c* from the CVT 204 thru the input shaft 131, mode clutch 110 and into the electric motor shaft 402 in this scenario.

In addition, during an "engine braking" condition such as when a vehicle is descending an incline, instead of the torque feeding back through the drivetrain to only the ICE, this hybrid mode also allows the torque to also be feed back to the electric motor which can act as a brake.

Figure 12A:
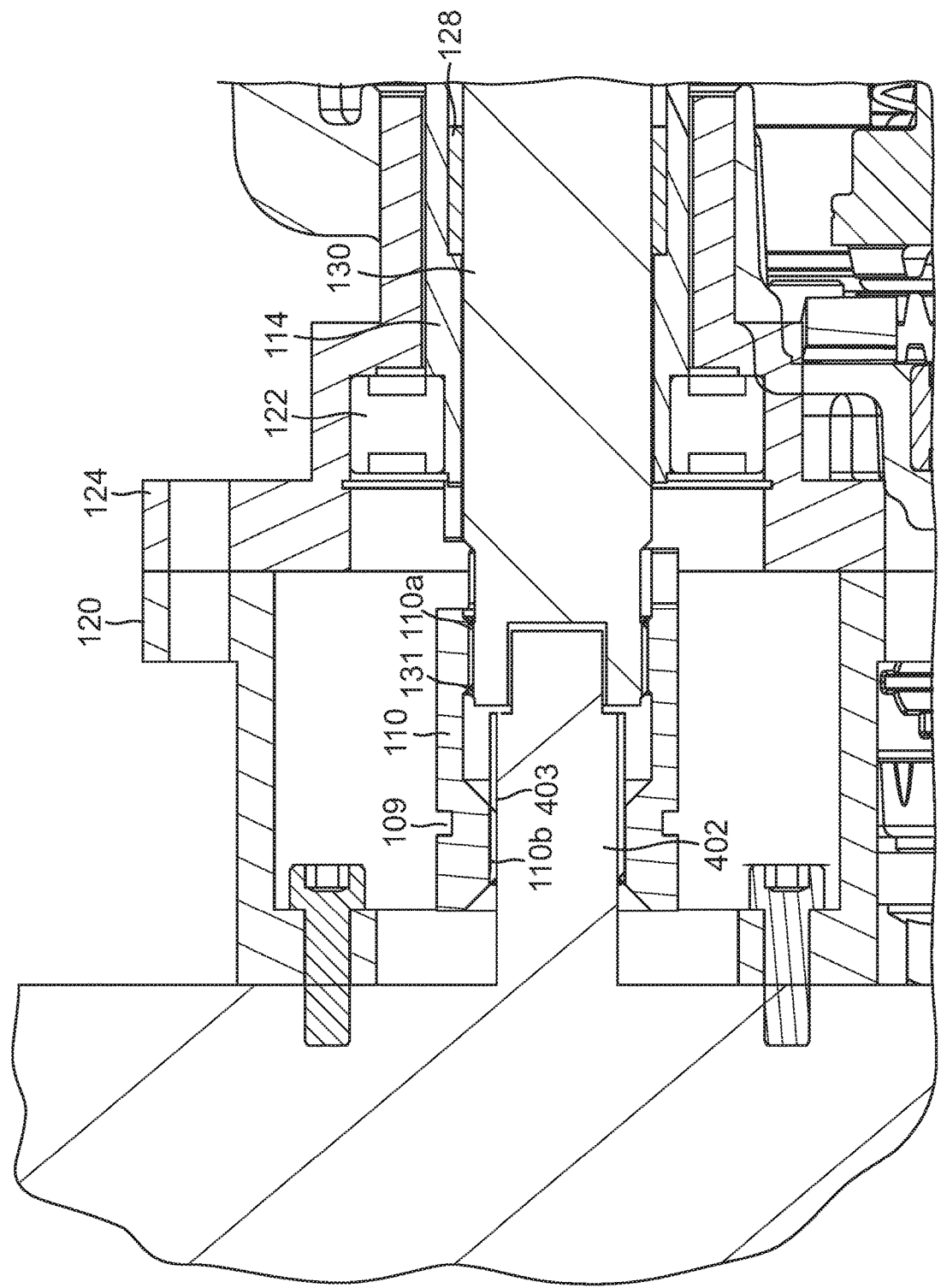
FIG. 12A is a partial close up side view of the mode clutch assembly in a third mode position of an exemplary embodiment.
Figure 12B:
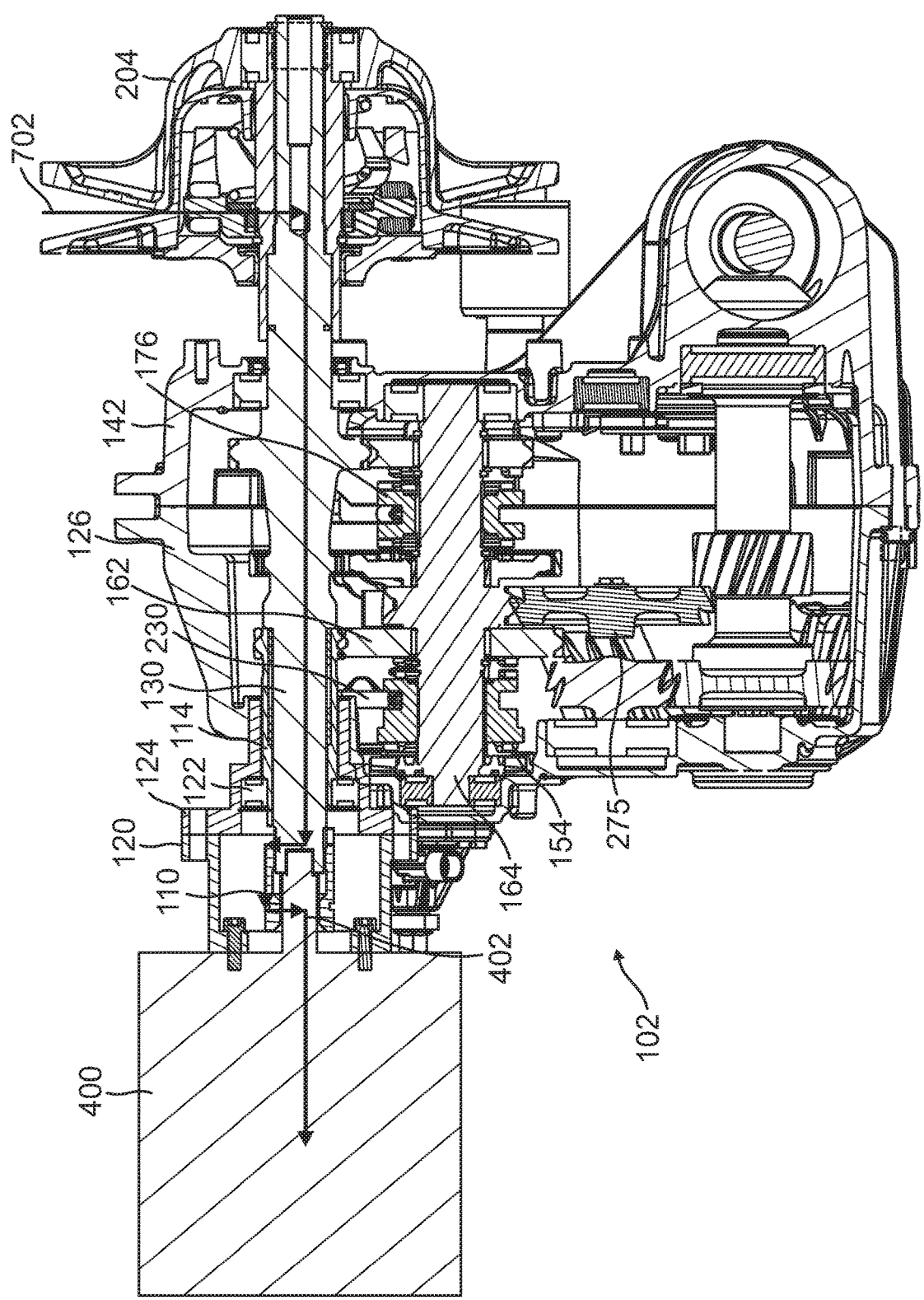
FIG. 12B is a partial cross-sectional side view of a transmission of an exemplary embodiment illustrating a torque path in the third mode.
Figure 12C:
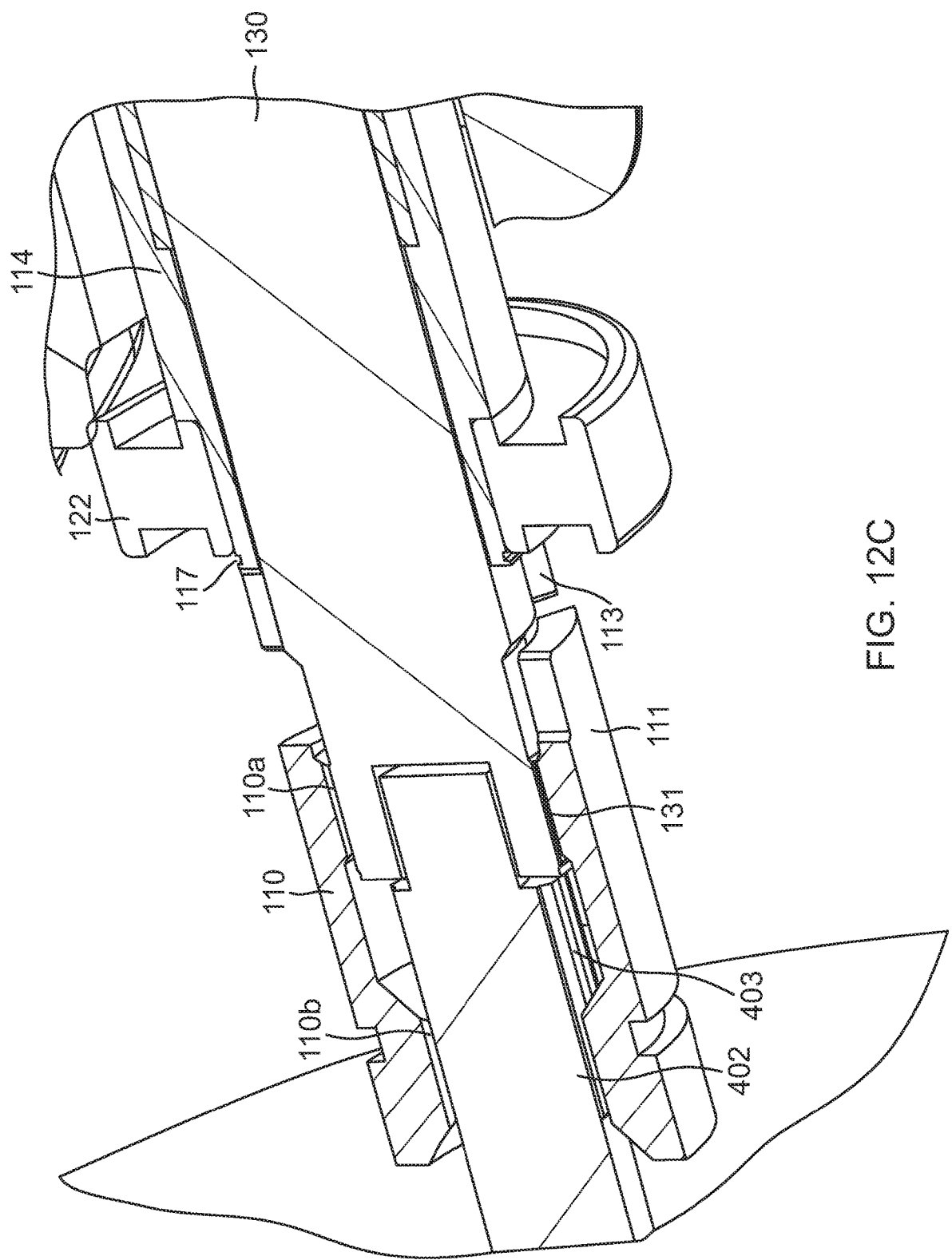
FIG. 12C is a partial close up side perspective view of the mode clutch assembly in the third mode position illustrated in FIG. 12A.

A third example mode is a charge at rest mode. This mode is illustrated in FIGS. 12A, 12B and 12C. FIG. 12A illustrates a close up cross-sectional side view of components of a mode clutch assembly in the hybrid mode configuration and FIG. 12C also illustrates a close up view of the components of the mode clutch assembly in a cross-sectional side perspective view. As illustrated, the second set of splines 110*b* of the mode clutch dog 110 are coupled to the exterior splines 403 on the electric motor shaft 402 to lock rotation of the mode clutch dog 110 to the rotation of the electric motor shaft 402. Further in this mode the first set of splines 110*a* of the mode clutch dog 110 are engaged with the mode engaging splines 131 of the input shaft 130. Hence, rotation of the mode clutch dog 110 is locked to the rotation of the input shaft 130. Also in this configuration, the spaced mode clutch dog teeth 111 in a first end of the mode clutch dog 110 are not engaged with the spaced driving member teeth 113 in the first end of the driving member 114. Hence rotation of the driving member 114 is not locked to the rotation mode clutch dog 110. This is best illustrated in FIG. 12C. FIG. 12C also illustrates a retaining groove 117 in the driving member that is designed to receive a retaining ring to hold bearing 122 in place. Similarly, in the housing adapter 124, there is a retaining ring groove to lock the outer race of the bearing 122 in place. The retaining ring received in the retaining ring groove of the housing adapter 124 is not shown. The retaining rings allow for axial load from gear meshes to be constrained.

FIG. 12B illustrates the torque path in this charge-at-rest mode. As illustrated torque is created by the ICE 300. The engine torque path 702 extends from the driven clutch 204 to the input shaft 130. From the input shaft 130, the torque of the engine torque path 702 passes to the mode clutch dog 110 to the electric motor shaft 402 of the motor. In this mode all other transmission gears are placed in neutral or park. Charge generated by the rotation of the electric motor 400 via the ICE 300 is used to charge batteries 506 (shown in FIG. 14) used, at least in part, to power the electric motor 400. Moreover, the charge may be used to power auxiliary electrically powered devices.

Figure 13A:
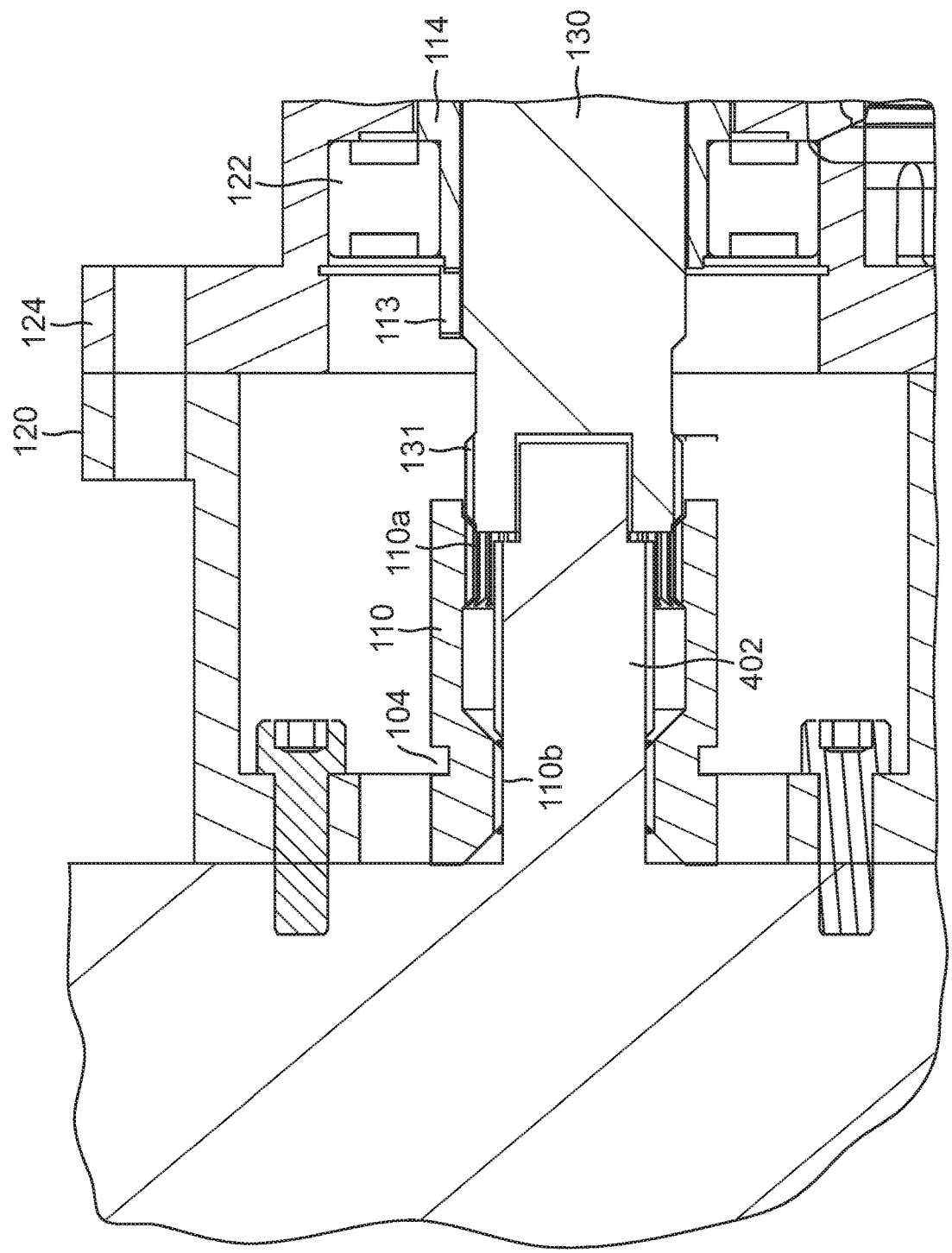
FIG. 13A is a partial close up side view of the mode clutch assembly in a fourth mode position of an exemplary embodiment.
Figure 13B:
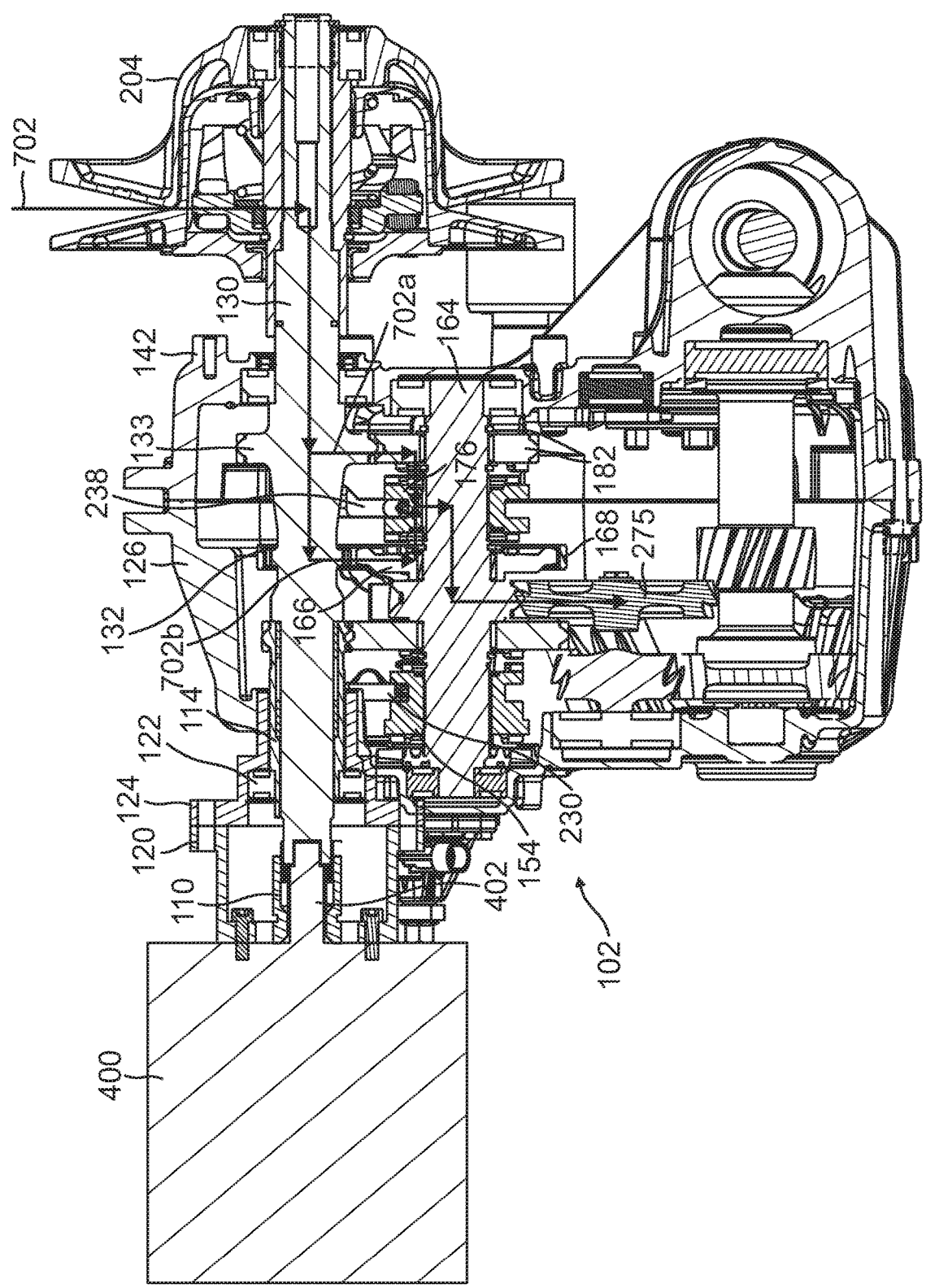
FIG. 13B is a partial cross-sectional side view of a transmission of an exemplary embodiment illustrating torque paths in the fourth mode.
Figure 13C:
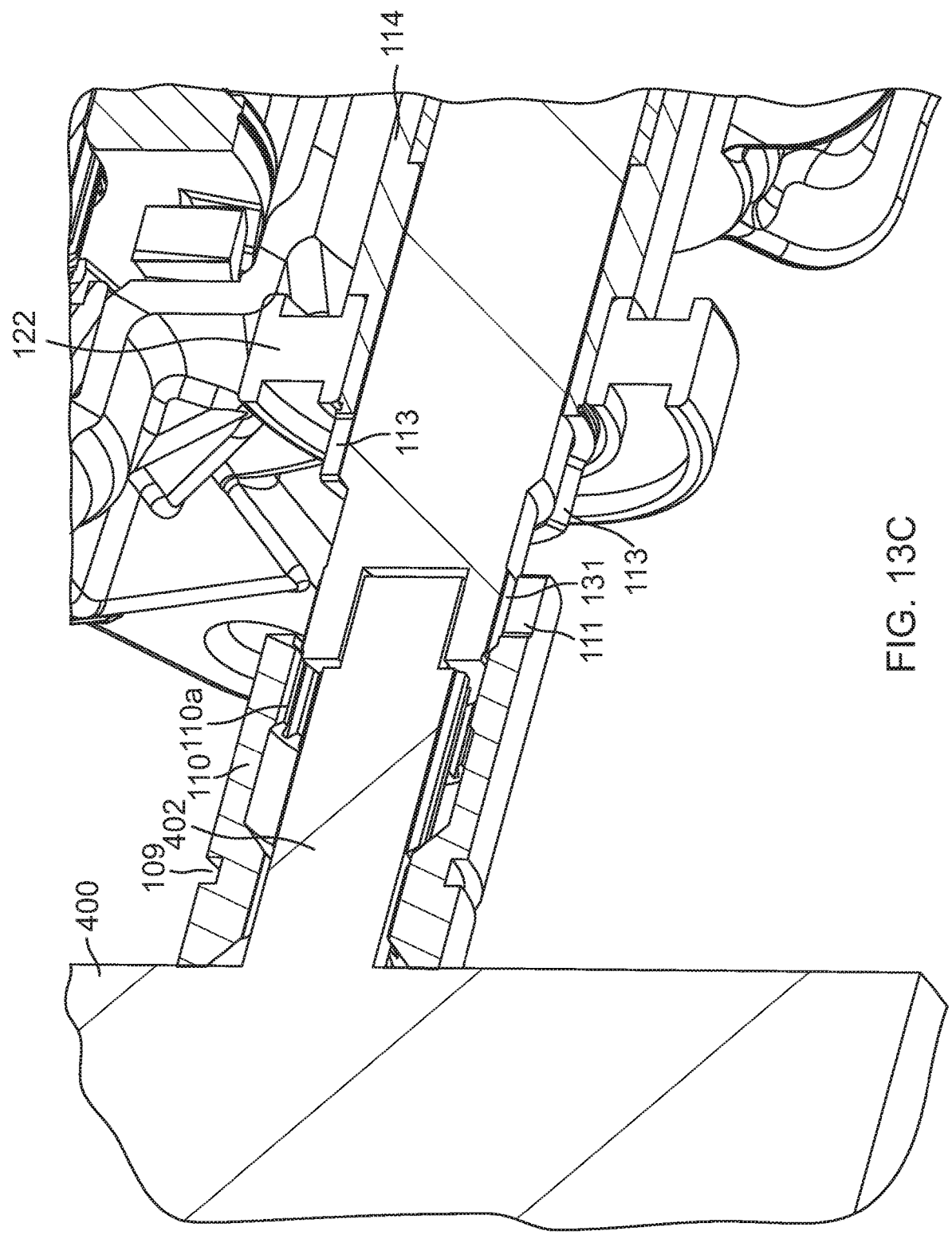
FIG. 13C is a partial close up side perspective view of the mode clutch assembly in the fourth mode position illustrated in FIG. 13A.

Another example mode is an ICE only mode. This mode is illustrated in FIGS. 13A, 13B and 13C. FIG. 13A illustrates a close up cross-sectional side view of components of a mode clutch assembly in the hybrid mode configuration and FIG. 13C also illustrates a close up view of the components of the mode clutch assembly in a cross-sectional side perspective view. As illustrated, the second set of splines 110b of the mode clutch dog 110 are not coupled to the exterior splines 403 on the electric motor shaft 402 in this mode. Hence, rotation of the mode clutch dog 110 is not locked to the rotation of the electric motor shaft 402. Further in this mode the first set of splines 110a of the mode clutch dog 110 are not engaged with the mode engaging splines 131 of the input shaft 130. Hence, rotation of the mode clutch dog 110 is not locked to the rotation of the input shaft 130. Also in this configuration, the spaced mode clutch dog teeth 111 in a first end of the mode clutch dog 110 are not engaged with the spaced driving member teeth 113 in the first end of the driving member 114. Hence rotation of the driving member 114 is not locked to the rotation mode clutch dog 110. This is best illustrated in FIG. 13C. Hence, in this configuration, the mode clutch dog 110 is axially positioned so it is isolated from rotation of the electric motor shaft 402, the input shaft 130 and the driving member 114.

FIG. 13B illustrates the torque path in this ICE only mode. In this mode, torque is created by the ICE 300 which is illustrated as engine torque 702. The engine torque path 702 extends from the driven clutch 204 to the input shaft 130. From the input shaft 130, the torque of the engine torque path 702 may take one of two paths depending on the axial position of the high/reverse shift dog 176. With the first engine torque path 702a, the high/reverse shift dog 176 is positioned to engage the high gear 182. With the second engine torque path 702b, the high/reverse shift dog 176 is positioned to engage the reverse sprocket gear 166. The first engine torque path 702a flows through the input shaft second gear 133 to the high gear 182, then through the high/reverse shift dog 176 to the counter shaft 164 to the central countershaft gear 164a and on to the transmission gear 275 of the transmission 102. The second torque path 702b flows through the input reverse shaft gear 132, the reverse chain 168, the reverse sprocket gear 166, the high/reverse shift dog 176 to counter shaft 164 then through the central countershaft gear 164a of the counter shaft 164 to the transmission gear 275 of the transmission 102.

As shown above, the position of the mode clutch dog 110 in example embodiments at least in part determines the operational mode of the hybrid system. Moreover, the position of the low/park shift dog 154 and the high/reverse shift dog 176 further determines torque flow through the transmission 102. Axial movement of the mode clutch dog 110 via mode clutch shift fork 106 may be manually controlled or be controlled at least in part by a controller. Moreover, movement of the shift drum 250 to axially move the low/park shift dog 154 and the high/reverse shift dog 176 into desired engagements via shift forks 230 and 238 may be manually performed or by a controller that synchronizes the shifted and mode select functions.

Figure 14:
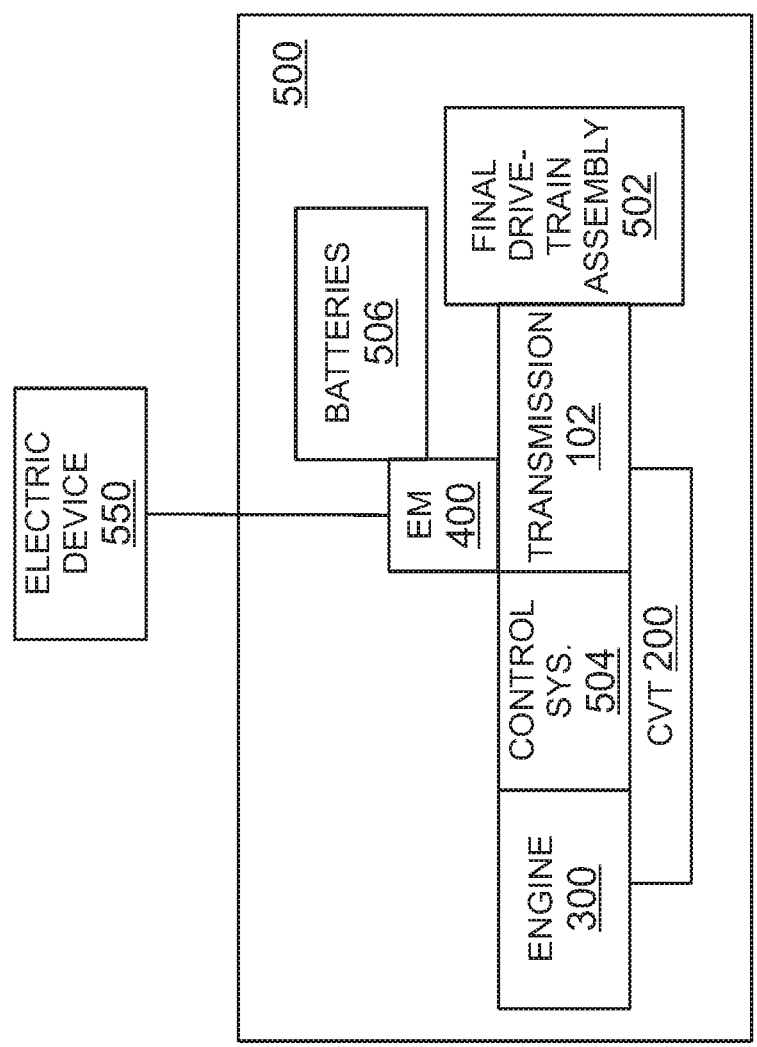
FIG. 14 is a block diagram of a vehicle of an exemplary embodiment.

Referring to FIG. 14, a block diagram of a hybrid vehicle 500 with a transmission as discussed above is illustrated. The hybrid vehicle 500 includes the engine 300 to provide engine torque to the transmission 102 and the electric motor 400 to provided electric motor torque to the transmission. The electric motor 400 is powered by batteries 506. Moreover, in the third mode described above a switch is used to allow the electric motor 400 to charge the batteries 506. This example embodiment further includes a control system 504 that contains one or more controllers that controls operation of the mode clutch dog 110 and/or the shift drum 250 to set the operation modes of the vehicle. In general, a controller may include any one or more of a processor, microprocessor, a digital signal processor (DSP), an application specific integrated circuit (ASIC), a field program gate array (FPGA), or equivalent discrete or integrated logic circuitry. In some example embodiments, controller may include multiple components, such as any combination of one or more microprocessors, one or more controllers, one or more DSPs, one or more ASICs, one or more FPGAs, as well as other discrete or integrated logic circuitry. The functions attributed to the controller herein may be embodied as software, firmware, hardware or any combination thereof. The controller may be part of a transmission control system, a vehicle control system or a component controller. The control system 504 may include a memory. The memory may include computer-readable operating instructions that, when executed by the controller provides mode select and gear changing functions. The computer readable instructions may be encoded within the memory. Moreover, the memory may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium. Further illustrated in FIG. 14 is a final drive train assembly 502. The final drive train assembly 502 includes the components of the vehicle that takes the torque from the transmission and uses it to propel the vehicle. The final drive train assembly 502 may include, but is not limited to, drive shafts, differentials, wheels, tires, propellers, tracks, etc. FIG. 14 also illustrates an external auxiliary electric device 550 that may be powered by the electric motor 400 when the hybrid driveline assembly of the vehicle 500 is in a mode operating as a generator.

Example Embodiments

Example 1 is a hybrid driveline assembly. The hybrid driveline assembly includes a mode clutch, a driving member and a mode clutch shift fork. The mode clutch dog has a first portion that is configured and arranged to be selectively coupled to a rotation of a first shaft. The first shaft is coupled to transfer torque from a first type of motor. The mode clutch dog further has a second portion that is configured and arranged to be selectively coupled to a rotation of a second shaft. The second shaft is coupled to transfer torque from a second different type of motor. The driving member has a first end that is configured to be selectively coupled to the mode clutch dog to selectively lock rotation of the driving member with rotation of the mode clutch dog. The driving member further includes at least one gear. The mode clutch shift fork is engaged with the mode clutch dog to selectively manipulate a position of the mode clutch dog to control the selectively coupling of the mode clutch dog to the first shaft, the second shaft and the driving member.

Example 2, includes the hybrid driveline assembly of Example 1, wherein the mode clutch dog is generally cylindrical in shape. An inner surface of the mode clutch dog has a first set of interior splines and a second set of interior splines. The first set of interior splines is configured to selectively engage an exterior set of input shaft splines of the first shaft that is coupled to transfer the torque from the first type of motor. The second set of interior splines of the mode clutch dog are configured to selectively engage external splines on the second shaft that is coupled to transfer torque from the second different type of motor.

Example 3 includes the hybrid driveline assembly of any of the Examples 1-2, wherein the mode clutch dog has an end with a plurality of spaced mode clutch dog teeth and the first end of the driving member has a plurality of spaced driving member teeth that configured to selectively engage the plurality of the spaced mode clutch dog teeth of the mode clutch dog.

Example 4 includes the hybrid driveline assembly of any of the Examples 1-3, wherein the mode clutch dog is generally cylindrical in shape. The mode clutch dog has a shift fork engaging groove. The mode clutch shift fork is configured to engage the shift fork engaging groove to selectively manipulate the position of the mode clutch dog.

Example 5 includes the hybrid driveline assembly of any of the Examples 1-4, wherein the mode clutch shift fork further includes a clutch shift shaft, an engagement portion and a manipulation portion. The engagement portion is coupled to the clutch shift shaft. The engagement portion has at least one arm. The at least one arm has an end portion that is received in the shift fork engaging groove of the mode clutch dog. The manipulation portion extends from the clutch shift shaft. The manipulation portion is configured to be manipulated to move the mode clutch shift fork.

Example 6 is a hybrid driveline assembly that includes an input shaft, an electric motor shaft, a mode clutch dog, a driving member and a mode clutch shift fork. The input shaft is coupled to transfer engine torque from an internal combustion engine. The electric motor shaft is coupled to transfer electric motor torque from an electric motor. The mode clutch dog has a first portion that is configured to be selectively coupled to the rotation of the input shaft and a second portion that is selectively coupled to the electric motor shaft. The driving member is received around the input shaft. The driving member is configured to be selectively coupled to rotation of the mode clutch dog. Moreover, the driving member has at least one gear. The mode clutch shift fork is engaged with the mode clutch dog to selectively manipulate a position of the mode clutch dog to control the selectively coupling of the mode clutch dog to the input shaft, the electric motor shaft and the driving member.

Example 7 includes the hybrid driveline assembly of Example 6, wherein the mode clutch dog is generally cylindrical in shape. An inner surface of the mode clutch dog has a first set of interior splines and a second set of interior splines. The first set of interior splines is configured to selectively engage an exterior set of input shaft splines of the input shaft. The second set of interior splines of the mode clutch dog is configured to selectively engage external splines on the electric motor shaft.

Example 8 includes the hybrid driveline assembly of any of the Examples 6-7, wherein the mode clutch dog has an end with a plurality of spaced mode clutch dog teeth and the driving member has an end with a plurality of spaced driving member teeth that are configured to selectively engage the plurality of the spaced mode clutch dog teeth of the mode clutch dog.

Example 9 includes the hybrid driveline assembly of any of the Examples 6-8, wherein the mode clutch dog is generally cylindrical in shape. The mode clutch dog has a shift fork engaging groove. The mode clutch shift fork is configured to engage the shift fork engaging groove to selectively manipulate the position of the mode clutch dog.

Example 10 includes the hybrid driveline assembly of any of the Examples 6-9, further including a countershaft and a low gear driven member. The low gear driven member rotationally mounted on the countershaft. The low driven gear member engaged with the at least one gear of the driving member.

Example 11 includes the hybrid driveline assembly of any of the Examples 6-10, further including a reverse sprocket, a reverse chain, a high gear, a low/park shift dog, and a high/reverse shift dog. The reverse sprocket is rotationally mounted on the countershaft. The reverse chain is received on the reverse sprocket and an input reverse shaft gear of the input shaft. The high gear is rotationally mounted on the countershaft. The high gear is engaged with an input shaft high gear of the input shaft. The low/park shift dog is rotationally lock mounted on the countershaft. The low/park shift dog is configured to be axially moved along the countershaft to selectively engage the low gear driven member to selectively convey torque from the low gear driven member to the countershaft. The high/reverse shift dog is rotationally lock mounted on the countershaft. The high/reverse shift dog is configured to be axially moved along the countershaft to selectively engage one of the reverse sprocket and the high gear to selectively convey torque from one of the reverse sprocket and the high gear to the counter shaft. The countershaft further has a central countershaft gear that is engaged with a transmission gear. The transmission gear being coupled to provide torque to a gear train of a transmission.

Example 12 includes the hybrid driveline assembly of any of the Examples 6-11, further including a shift drum, a first shift fork and a second shift fork. The shift drum is configured to selectively rotate. The first shift fork is configured to axially move the low/park shift dog to selectively engage the low gear driven member based on select rotational movement of the shift drum. The second shift fork is configured to axially move the high/reverse shift dog to selectively engage one of the reverse sprocket and the high gear based on select rotational movement of the shift drum.

Example 13 includes the hybrid driveline assembly of any of the Examples 6-12, further including a continuously variable transmission. The continuously variable transmission includes a drive clutch and a driven clutch. The drive clutch is coupled to receive engine torque from the internal combustion engine. The driven clutch is in rotational communication with the drive clutch. The driven clutch is rotationally coupled to the input shaft.

Example 14 includes the hybrid driveline assembly of any of the Examples 6-13, further including at least one motor mount adaptor portion coupled to a housing of the electric motor. The at least one motor mount adaptor portion is configured to house the mode clutch dog and at least a portion of the driving member.

Example 15 includes a vehicle including an internal combustion engine, a continuously variable transmission, an input shaft, an electric motor, a mode clutch assembly and a final drive train assembly. The internal combustion engine provides engine torque. The continuously variable transmission includes a drive clutch and a driven clutch. The drive clutch is coupled to transfer the engine torque from the internal combustion engine. The driven clutch is configured to be in rotational communication with the drive clutch. The input shaft is rotationally coupled to the driven clutch. The electric motor is used in part to generate electric motor torque. The electric motor has an electric motor shaft. The mode clutch assembly includes a mode clutch dog and a mode clutch shift fork. The mode clutch dog has a first portion that is configured to be selectively coupled to the rotation of the input shaft and a second portion that is selectively coupled to the electric motor shaft. The mode clutch shift fork is engaged with the mode clutch dog to selectively manipulate a position of the mode clutch dog to control the selectively coupling of the mode clutch dog to the input shaft and the electric motor shaft. The final drive train assembly is coupled to at least one output of a transmission. The final drive assembly is configured to use torque received from the transmission to propel the vehicle.

Example 16 includes the vehicle of Example 15, wherein the mode clutch assembly further includes a driving member that is received around the input shaft. The driving member is configured to be selectively coupled to rotation of the mode clutch dog via selectively positioning the mode clutch dog with the mode clutch shift fork. The driving member has at least one gear.

Example 17 includes the vehicle of any of the Examples 15-16, wherein the mode clutch dog has an end with a plurality of spaced mode clutch dog teeth. Further the driving member has an end with a plurality of spaced driving member teeth that are configured to selectively engage the plurality of the spaced mode clutch dog teeth of the mode clutch dog.

Example 18 includes the vehicle of any of the Examples 15-17, further including at least one controller that is configured to cause the mode clutch shift fork to manipulate the position of the mode clutch dog in achieving different operational modes of the vehicle.

Example 19 includes the vehicle of any of the Examples 15-18, wherein the mode clutch dog of the mode clutch assembly is generally cylindrical in shape. An inner surface of the mode clutch dog has a first set of interior splines and a second set of interior splines. The first set of interior splines is configured to selectively engage an exterior set of input shaft splines of the input shaft. The second set of interior splines of the mode clutch dog are configured to selectively engage external splines on electric motor shaft.

Example 20 includes the vehicle of any of the Examples 15-19, wherein the mode clutch dog of the mode clutch assembly is generally cylindrical in shape. The mode clutch dog has a shift fork engaging groove. The mode clutch shift fork is configured to engage the shift fork engaging groove to selectively manipulate the position of the mode clutch dog.

Example 21 includes the vehicle of any examples 15-20, wherein the electric motor is configured to receive torque when being used for at least one of creating braking torque and as a generator.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A hybrid driveline assembly comprising:
a mode clutch dog having a first portion configured and arranged to be selectively coupled to a rotation of a first shaft, the first shaft being coupled to transfer torque from a first motor, the mode clutch dog further having a second portion configured and arranged to be selectively coupled to a rotation of a second shaft, the second shaft being coupled to transfer torque from a second different motor;
a driving member having a first end configured to be selectively coupled to the mode clutch dog to selectively lock rotation of the driving member with rotation of the mode clutch dog, the driving member further including at least one gear;
a mode clutch shift fork engaged with the mode clutch dog to selectively manipulate a position of the mode clutch dog to control the selectively coupling of the mode clutch dog to the first shaft, the second shaft and the driving member; and
a continuously variable transmission including,
a drive clutch coupled to receive engine torque from the first motor, and
a driven clutch in rotational communication with the drive clutch, the driven clutch rotationally coupled to the first shaft.

2. The hybrid driveline assembly of claim 1, wherein the mode clutch dog is generally cylindrical in shape, an inner surface of the mode clutch dog having a first set of interior splines and a second set of interior splines, the first set of interior splines configured to selectively engage an exterior set of input shaft splines of the first shaft that is coupled to transfer the torque from the first type of motor, the second set of interior splines of the mode clutch dog configured to selectively engage external splines on the second shaft that is coupled to transfer torque from the second different type of motor.

3. The hybrid driveline assembly of claim 1, wherein the mode clutch dog has an end with a plurality of spaced mode clutch dog teeth and the first end of the driving member has a plurality of spaced driving member teeth configured to selectively engage the plurality of the spaced mode clutch dog teeth of the mode clutch dog.

4. The hybrid driveline assembly of claim 1, wherein the mode clutch dog is generally cylindrical in shape, the mode clutch dog having a shift fork engaging groove, the mode clutch shift fork configured to engage the shift fork engaging groove to selectively manipulate the position of the mode clutch dog.

5. The hybrid driveline assembly of claim 4, wherein the mode clutch shift fork further comprises:
a clutch shift shaft;
an engagement portion coupled to the clutch shift shaft, the engagement portion having at least one arms with an end portion received in the shift fork engaging groove of the mode clutch dog; and
a manipulation portion extending from the clutch shift shaft, the manipulation portion configured to be manipulated to move the mode clutch shift fork.

6. A hybrid driveline assembly comprising:
an input shaft coupled to transfer engine torque from an internal combustion engine;
an electric motor shaft coupled to transfer electric motor torque from an electric motor;
a continuously variable transmission including,
a drive clutch coupled to receive engine torque from the internal combustion engine, and
a driven clutch in rotational communication with the drive clutch, the driven clutch rotationally coupled to the input shaft;
a mode clutch dog having a first portion configured to be selectively coupled to the rotation of the input shaft and a second portion selectively coupled to the electric motor shaft;

a driving member received around the input shaft, the driving member configured to be selectively coupled to rotation of the mode clutch dog, the driving member having at least one gear; and a mode clutch shift fork engaged with the mode clutch dog to selectively manipulate a position of the mode clutch dog to control the selectively coupling of the mode clutch dog to the input shaft, the electric motor shaft and the driving member.

7. The hybrid driveline assembly of claim 6, wherein the mode clutch dog is cylindrical in shape, an inner surface of the mode clutch dog having a first set of interior splines and a second set of interior splines, the first set of interior splines configured to selectively engage an exterior set of input shaft splines of the input shaft, the second set of interior splines of the mode clutch dog configured to selectively engage external splines on the electric motor shaft.

8. The hybrid driveline assembly of claim 6, wherein:
the mode clutch dog having an end with a plurality of spaced mode clutch dog teeth; and
the driving member having an end with a plurality of spaced driving member teeth that are configured to selectively engage the plurality of the spaced mode clutch dog teeth of the mode clutch dog.

9. The hybrid driveline assembly of claim 6, wherein the mode clutch dog is generally cylindrical in shape, the mode clutch dog having a shift fork engaging groove, the mode clutch shift fork configured to engage the shift fork engaging groove to selectively manipulate the position of the mode clutch dog.

10. The hybrid driveline assembly of claim 6, further comprising:
a countershaft; and
a low gear driven member rotationally mounted on the countershaft, the low gear driven member engaged with the at least one gear of the driving member.

11. The hybrid driveline assembly of claim 10, further comprising:
a reverse sprocket rotationally mounted on the countershaft;
a reverse chain received on the reverse sprocket and an input reverse shaft gear of the input shaft;
a high gear rotationally mounted on the countershaft, the high gear engaged with an input shaft high gear of the input shaft;
a low/park shift dog rotationally lock mounted on the countershaft, the low/park shift dog configured to be axially moved along the countershaft to selectively engage the low gear driven member to selectively convey torque from the low gear driven member to the countershaft;
a high/reverse shift dog rotationally lock mounted on the countershaft, the high/reverse shift dog configured to be axially moved along the countershaft to selectively engage one of the reverse sprocket and the high gear to selectively convey torque from one of the reverse sprocket and the high gear to the counter shaft; and
the countershaft further having a central countershaft gear engaged with a transmission gear, the transmission gear coupled to provide torque to a gear train of a transmission.

12. The hybrid driveline assembly of claim 11, further comprising:
a shift drum configured to selectively rotate;
a first shift fork configured to axially move the low/park shift dog to selectively engage the low gear driven member based on select rotational movement of the shift drum; and
a second shift fork configured to axially move the high/reverse shift dog to selectively engage one of the reverse sprocket and the high gear based on select rotational movement of the shift drum.

13. A hybrid driveline assembly comprising:
an input shaft coupled to transfer engine torque from an internal combustion engine;
an electric motor shaft coupled to transfer electric motor torque from an electric motor;
a mode clutch dog having a first portion configured to be selectively coupled to the rotation of the input shaft and a second portion selectively coupled to the electric motor shaft;
a driving member received around the input shaft, the driving member configured to be selectively coupled to rotation of the mode clutch dog, the driving member having at least one gear;
a mode clutch shift fork engaged with the mode clutch dog to selectively manipulate a position of the mode clutch dog to control the selectively coupling of the mode clutch dog to the input shaft, the electric motor shaft and the driving member; and
at least one motor mount adaptor portion coupled to a housing of the electric motor, the at least one motor mount adaptor portion configured to house the mode clutch dog and at least a portion of the driving member.

14. A vehicle comprising:
an internal combustion engine to provide engine torque;
a continuously variable transmission including,
a drive clutch coupled to transfer the engine torque from the internal combustion engine, and
a driven clutch configured to be in rotational communication with the drive clutch,
an input shaft rotationally coupled to the driven clutch;
an electric motor used in part to generate electric motor torque, the electric motor having an electric motor shaft;
a mode clutch assembly including,
a mode clutch dog having a first portion configured to be selectively coupled to the rotation of the input shaft and a second portion selectively coupled to the electric motor shaft, and
a mode clutch shift fork engaged with the mode clutch dog to selectively manipulate a position of the mode clutch dog to control the selectively coupling of the mode clutch dog to the input shaft and the electric motor shaft; and a final drive train assembly coupled to at least one output of a transmission, the final drive assembly configured to use torque received from the transmission to propel the vehicle; and
a driving member received around the input shaft, the driving member configured to be selectively coupled to rotation of the mode clutch dog via selectively positioning the mode clutch dog with the mode clutch shift fork, the driving member having at least one gear.

15. The vehicle of claim 14, wherein:
the mode clutch dog having an end with a plurality of spaced mode clutch dog teeth; and
the driving member having an end with a plurality of spaced driving member teeth that are configured to selectively engage the plurality of the spaced mode clutch dog teeth of the mode clutch dog.

16. The vehicle of claim 14, further comprising:
at least one controller configured to cause the mode clutch shift fork to manipulate the position of the mode clutch dog in achieving different operational modes of the vehicle.

17. The vehicle of claim 14, wherein the mode clutch dog of the mode clutch assembly is generally cylindrical in shape, an inner surface of the mode clutch dog having a first set of interior splines and a second set of interior splines, the first set of interior splines configured to selectively engage an exterior set of input shaft splines of the input shaft, the second set of interior splines of the mode clutch dog configured to selectively engage external splines on electric motor shaft.

18. The vehicle of claim 14, wherein the mode clutch dog of the mode clutch assembly is generally cylindrical in shape, the mode clutch dog having a shift fork engaging groove, the mode clutch shift fork configured to engage the shift fork engaging groove to selectively manipulate the position of the mode clutch dog.

19. The vehicle of claim 14, wherein the electric motor is configured to receive torque when being used for at least one of creating braking torque and as a generator.

* * * * *